United States Patent
Takano

(10) Patent No.: US 9,392,585 B2
(45) Date of Patent: Jul. 12, 2016

(54) BASE STATION, COMMUNICATION METHOD AND PROGRAM

(71) Applicant: Sony Corporation, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 14/364,445

(22) PCT Filed: Dec. 25, 2012

(86) PCT No.: PCT/JP2012/008264
§ 371 (c)(1),
(2) Date: Jun. 11, 2014

(87) PCT Pub. No.: WO2013/099218
PCT Pub. Date: Jul. 4, 2013

(65) Prior Publication Data
US 2014/0301349 A1  Oct. 9, 2014

(30) Foreign Application Priority Data

Dec. 28, 2011  (JP) .................................. 2011-288780

(51) Int. Cl.
*G01R 31/08* (2006.01)
*H04W 72/04* (2009.01)
(Continued)

(52) U.S. Cl.
CPC ......... *H04W 72/0406* (2013.01); *H04L 1/0086* (2013.01); *H04L 5/0048* (2013.01); *H04L 5/0073* (2013.01); *H04W 84/045* (2013.01)

(58) Field of Classification Search
USPC ........................................ 370/329, 252, 328
See application file for complete search history.

(56) References Cited

U.S. PATENT DOCUMENTS

2005/0100119 A1  5/2005  Husted et al.
2011/0116480 A1  5/2011  Li et al.
(Continued)

FOREIGN PATENT DOCUMENTS

EP  0 986 282 A1  3/2000
EP  2 259 466 A2  12/2010
(Continued)

OTHER PUBLICATIONS

No Author Listed, Ericsson et al., "On blank MBSFN subframes for eICIC", 3$^{rd}$ Generation Partnership Project (3GPP) Draft; R4-113830, vol. RAN WG4, Bucharest, Romania, Jun. 27-Jul. 1, 2011, 4 pages.

(Continued)

*Primary Examiner* — Duc C Ho
(74) *Attorney, Agent, or Firm* — Wolf, Greenfield & Sacks, P.C.

(57) ABSTRACT

Some aspects of the present disclosure relate to a base station, a communication method, and a program for supporting a multiple_ABS feature of the 3rd Generation Partnership Project (3GPP). In some embodiments, an interference protection status of a communication frame is determined, based at least in part on configurations of base stations. The configurations may indicate patterns of one of more frames of a first type. The first type of frame may be an Absolute Blank Subframe type. Some of the configurations may differ, at least in part. In some embodiments, the interference protection status of a frame may be determined to be a protected status, an unprotected status, or a partially protected status.

21 Claims, 19 Drawing Sheets

(51) Int. Cl.
*H04L 1/00* (2006.01)
*H04W 84/04* (2009.01)
*H04L 5/00* (2006.01)

(56) References Cited

U.S. PATENT DOCUMENTS

| | | | |
|---|---|---|---|
| 2011/0151790 A1 | 6/2011 | Khandekar et al. | |
| 2011/0305295 A1 | 12/2011 | Kim et al. | |
| 2011/0310802 A1 | 12/2011 | Song et al. | |
| 2011/0310830 A1 | 12/2011 | Wu et al. | |
| 2012/0106476 A1* | 5/2012 | Song | H04W 72/082 370/329 |
| 2012/0113843 A1* | 5/2012 | Watfa | H04W 72/1289 370/252 |
| 2013/0033998 A1* | 2/2013 | Seo | H04W 24/00 370/252 |
| 2013/0225192 A1* | 8/2013 | Yamamoto | H04W 16/16 455/452.1 |
| 2013/0258895 A1* | 10/2013 | Kim | H04J 11/0056 370/252 |
| 2014/0341058 A1 | 11/2014 | Takano | |

FOREIGN PATENT DOCUMENTS

| | | |
|---|---|---|
| JP | 2011-521512 A | 7/2011 |
| JP | 2013-526154 A | 6/2013 |
| JP | 2013-534094 A | 8/2013 |
| WO | WO 2011/116480 A1 | 9/2011 |
| WO | WO 2011/122833 A2 | 10/2011 |
| WO | WO 2011/130447 A1 | 10/2011 |
| WO | WO 2011/157236 A1 | 12/2011 |

OTHER PUBLICATIONS

No Author Listed, Fujitsu, "Signalling Design for Almost Blank Subframe Patters", 3$^{rd}$ Generation Partnership Project (3GPP) Draft; R2-110457, vol. RAN WG2, Dublin, Ireland, Jan. 17-21, 2011, 4 pages.

No Author Listed, NEC, "Considerations on UE demodulation and CSI verification for eICIC", 3$^{rd}$ Generation Partnership Project (3GPP) Draft; R4-113727, vol. RAN WG4, Bucharest, Romania, Jun. 27-Jul. 1, 2011, 6 pages.

No Author Listed, Nokia Siemens Networks et al., "Network-to-UE signalling for TDM eICIC", 3$^{rd}$ Generation Partnership Project (3GPP) Draft; R2-106223, vol. RAN WG2, Jacksonville, US, Nov. 15-19, 2010, 8 pages.

No Author Listed, NTT DoCoMo, "Remaining issues on eICIC for Rel-10", 3$^{rd}$ Generation Partnership Project (3GPP) Draft; R1-106184, vol. RAN WG1, Jacksonville, USA, Nov. 15-19, 2010, 6 pages.

No Author Listed, Potevio, "Further Consideration on Two Scenarios of Non CA-based ICIC", 3$^{rd}$ Generation Partnership Project (3GPP) Draft; R2-114146, vol. TSG RAN2, Athens, Greece, Aug. 22-26, 2011, 2 pages.

No Author Listed, Qualcomm Incorporated, "eICIC for a pico eNB with multiple interfering macro eNBs", 3$^{rd}$ Generation Partnership Project (3GPP) Draft; R3-103415, vol. RAN WG3, Jacksonville, USA, Nov. 15-19, 2010, 2 pages.

No Author Listed, Qualcomm Incorporated, "Overview of eICIC backhaul procedure", 3$^{rd}$ Generation Partnership Project (3GPP) Draft; R3-103414, vol. RAN W63, Jacksonville, USA, Nov. 15-19, 2010, 4 pages.

No Author Listed, RAN1, "Way Forward on time-domain extension of Rel 8/9 backhaul-based ICIC", 3$^{rd}$ Generation Partnership Project (3GPP) Draft; R1-105779, vol. RAN WG1, Xi'an, P.R. China, Oct. 11-15, 2010, 4 pages.

No Author Listed, Samsung, "Need of common ABS subset", 3$^{rd}$ Generation Partnership Projet (EGPP) Draft; R2-110424, vol. RAN WG2, Dublin, Ireland, Jan. 17-21, 2011, 4 pages.

No Author Listed, ZTE, "Discussion on measurement restriction of eICIC", 3$^{rd}$ Generation Partnership Project (3GPP) Draft; R2-106332, vol. RAN WG2, Jacksonville, USA, Nov. 15-19, 2010, 6 pages.

No Author Listed, Nokia Siemens Networks et al., "On TDM eICIC Coordination for Macro+Pico Cases", 3$^{rd}$ Generation Partnership Project (3GPP) RAN WG3 #69-BIS Meeting. Xi'an, China, Oct. 11-15, 2010. 6 pages.

No Author Listed, Qualcomm Europe "Subframe specific channel quality reporting", 3rd Generation Partnership Project (3GPP) TSG-RAN WG1 #59. R1-094998. Nov. 9-13, 2009. 5 pages.

No Author Listed, Renesas Mobile Europe Ltd., Discussion on Rel' 11 eICIC Scenarios, 3$^{rd}$ Generation Partnership Project (3GPP) TSG-RAN WGI #66, R1-112798, Athens, Greece, Aug. 22-26, 2011, 14 pages.

Singaporean Written Opinion mailed Mar. 9, 2016 in connection with Singaporean Application No. 11201403462W.

* cited by examiner

CONTROL AREA   DATA AREA

CONTROL AREA   DATA AREA

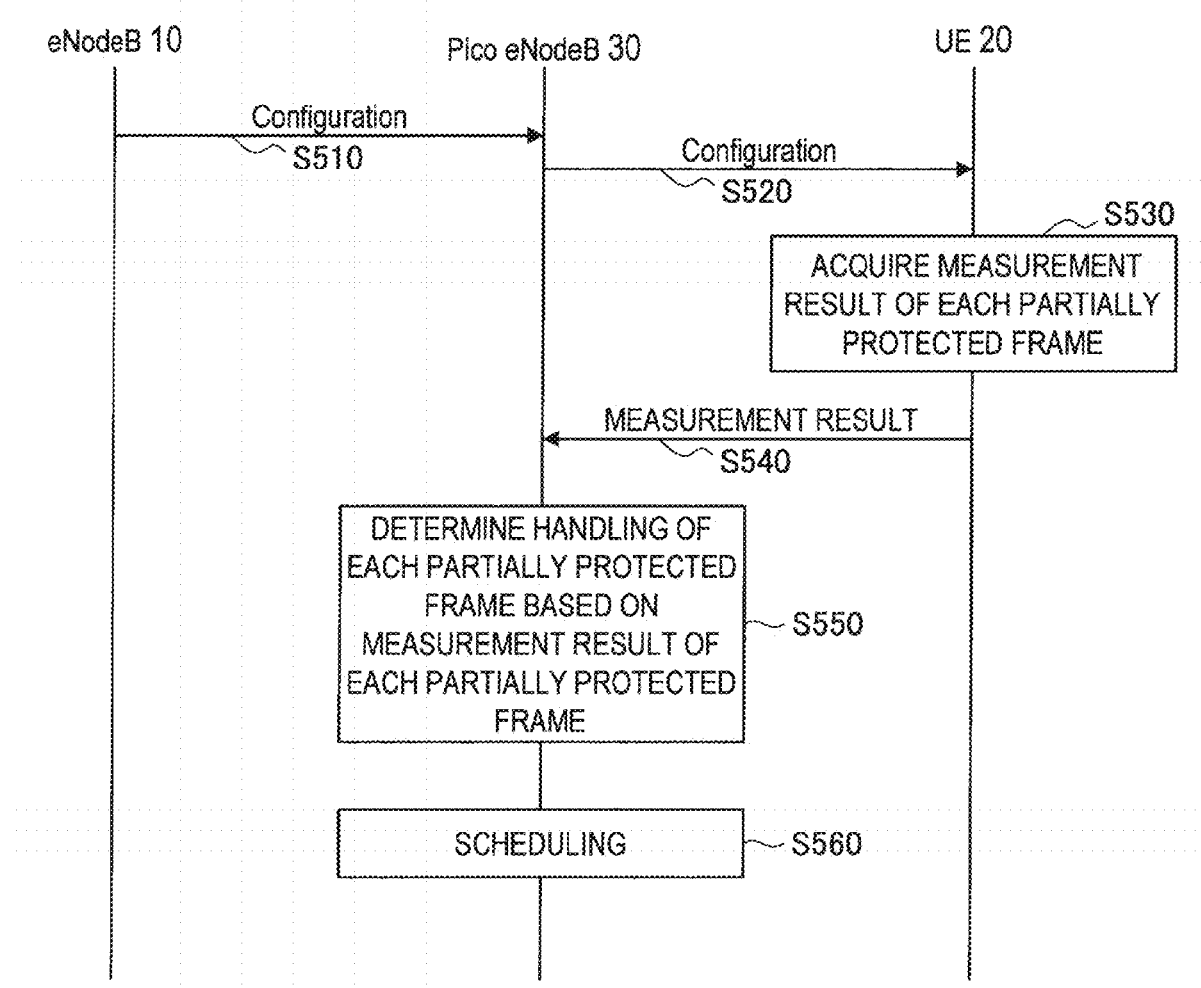

BASE STATION, COMMUNICATION METHOD AND PROGRAM

CROSS-REFERENCE TO RELATED APPLICATIONS

The present application builds upon concepts disclosed in a prior application by one or more of the inventors and/or the assignee, including the following: Japan Patent Application No. 2011-288780, titled "BASE STATION, COMMUNICATION METHOD, AND PROGRAM," filed Dec. 28, 2011.

TECHNICAL FIELD

The present disclosure relates to a base station, a communication method, and a program.

BACKGROUND ART

At present, in the 3rd Generation Partnership Project (3GPP), the standardization process of LTE, the next-generation wireless communication standard, is in progress so as to further improve the performance of wireless communications. In LTE, examination has been conducted to improve coverage by the introduction of base stations other than macro eNodeBs, such as Home eNodeBs (femtocell base stations, or small base stations for mobile phones), Remote Radio Heads (RRHs), pico eNodeBs, or the like. Such next generation wireless communication is disclosed in, for example, JP 2011-521512A.

Also, in LTE Rel-10, an interference control method called Almost Blank Subframe (ABS) has been standardized. An ABS is a subframe which limits transmission other than a reference signal from a macro eNodeB in some subframes, or a subframe in which transmission other than a reference signal from a macro eNodeB is limited. A subframe set as an ABS may reduce interference with respect to a received signal of a user equipment (UE) belonging to a pico eNodeB located within a cell a macro eNodeB provides. Also, setting the same subframe between neighboring macro eNodeBs has been proposed.

CITATION LIST

Patent Literature

JP 2011-521512A

SUMMARY

However, in the 3GPP, multiple_ABS technology for permitting the setting of different ABSs between macro eNodeBs has been discussed. If multiple_ABS is introduced, macro eNodeBs setting the same subframe as the ABS and macro eNodeBs not setting the same subframe as the ABS are mixed among a plurality of neighboring macro eNodeBs. As a result, even in subframes which are set as ABSs by a macro eNodeB, a received signal of a UE belonging to a pico eNodeB may receive interference from neighboring macro eNodeBs.

Therefore, the present disclosure proposes a new and improved base station, communication method, and program, which can appropriately determine a protection status from interference of each communication frame. Whether an ABS configuration is well-suited to a particular cell or area may depend on the number of communication terminals in that cell or area. Thus, one advantage of multiple_ABS technology is that it allows macro eNodeBs to use different ABS configurations in different cells or areas, which protects communication terminals from interference without unduly limiting the terminals' communication throughput. However, as described above, the use of multiple_ABS technology gives rise to a scenario in which one or more base stations near a terminal treat a given subframe as an ABS, while one or more other base stations near the terminal do not treat the subframe as an ABS. As a result, the terminal may experience some interference associated with the subframe. Some aspects of the present disclosure relate to techniques for determining, at a base station, an interference protection status for a communication control device associated with the base station. In addition, some aspects of the present disclosure relate to transmitting information from the base station to the communication control device in a format that is backward compatible with existing techniques for transmitting information from a base station to a communication control device.

According to an embodiment of the present disclosure, there is provided a method which includes, with a processor of a base station, determining an interference protection status of a frame based at least in part on information indicating configurations of base stations, wherein a first of the configurations differs from at least a second of the configurations, and wherein a portion of the information indicating the second of the configurations is received from a second base station.

According to another embodiment of the present disclosure, there is provided a base station including an interference determination unit configured to determine an interference protection status of a frame based at least in part on information indicating configurations of two or more base stations, wherein a first of the configurations differs from at least a second of the configurations, and wherein a portion of the information indicating the second of the configurations is received from a second base station.

According to another embodiment of the present disclosure, there is provided a computer-readable medium having recorded thereon a computer program which, when executed by at least one processing unit, performs a method including determining an interference protection status of a frame based at least in part on information indicating configurations of base stations, wherein a first of the configurations differs from at least a second of the configurations, and wherein a portion of the information indicating the second of the configurations is received from a second base station. According to another embodiment of the present disclosure, there is provided a wireless communication system including a first base station and a second base station. The first base station includes an interference determination unit. The first base station is configured to store information indicating a first configuration. The second base station is configured to store information indicating a second configuration. The interference determination unit of the first base station is configured to determine an interference protection status of a frame based at least in part on the information indicating the first configuration of the first base station and the information indicating the second configuration of the second base station, and the first configuration differs from the second configuration.

Advantageous Effects of Invention

As described above, according to the present disclosure, a protection status from interference of each communication frame can be appropriately determined.

BRIEF DESCRIPTION OF DRAWINGS

FIG. 20 is a sequence diagram illustrating an operation of a communication system according to a third embodiment of the present disclosure.

DESCRIPTION OF EMBODIMENTS

Figure 1:
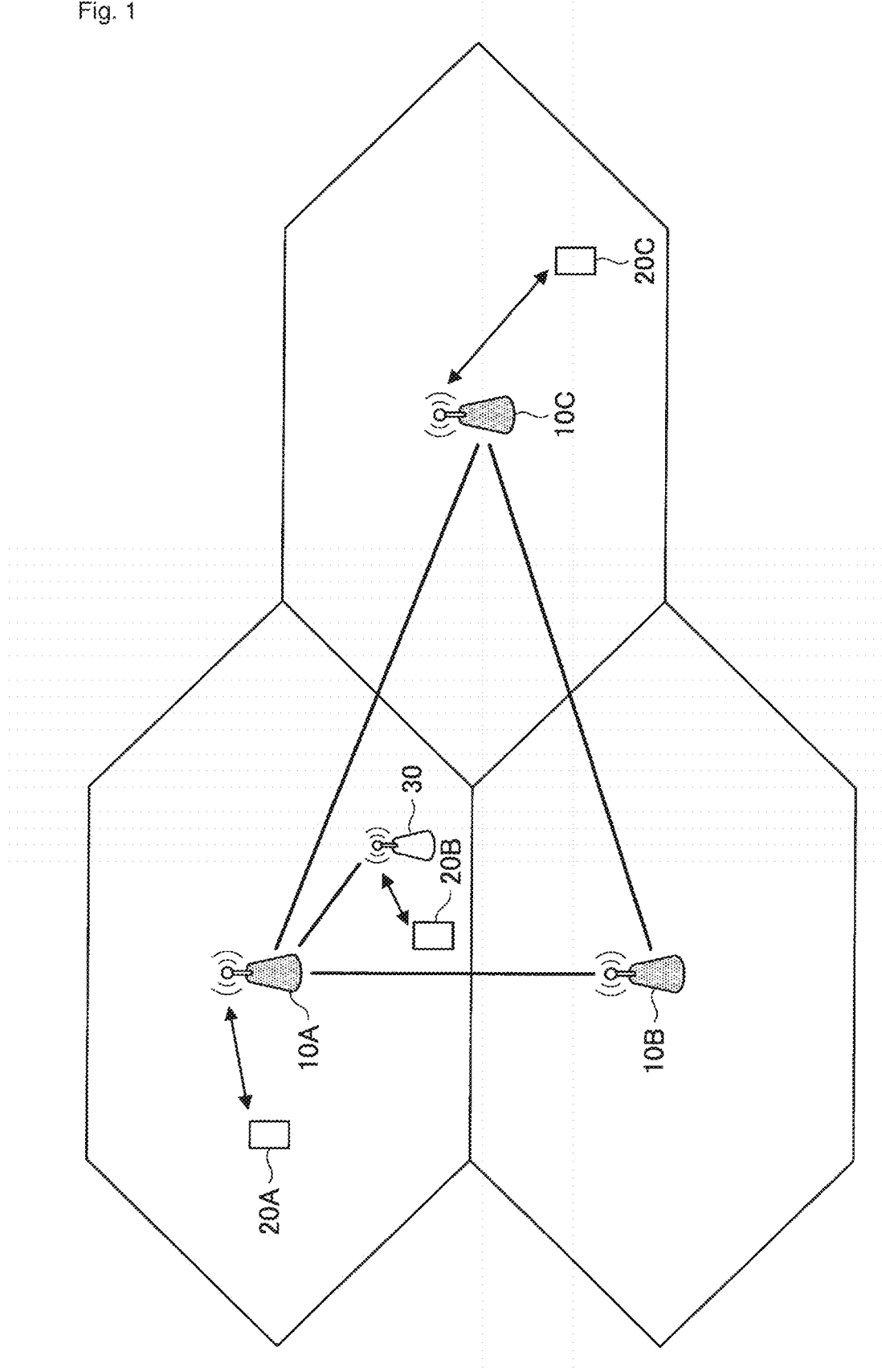
FIG. 1 is an explanatory diagram illustrating a configuration of a communication system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in this specification and the drawings, there are cases in which a plurality of elements that have substantially the same function and structure are distinguished from one another by assigning different letters after the same reference signs. For example, a plurality of configurations that have substantially the same functional configuration, if necessary, are distinguished such as in UEs 20A, 20B and 20C. However, if the plurality of elements that have substantially the same functional configuration need not be especially distinguished from one another, the common reference sign alone is assigned thereto. For example, if the UEs 20A, 20B and 20C need not be especially distinguished from one another, they are simply referred to as the UEs 20.

Also, the present disclosure will be described in order of the following items.

1. Basic Configuration of Communication System
2. First Embodiment
2-1. Configuration of eNodeB According to First Embodiment
2-2. Operation of eNodeB According to First Embodiment
2-3. Application Example
3. Second Embodiment
3-1. Configuration of eNodeB According to Second Embodiment
3-2. Operation of eNodeB According to Second Embodiment
3-3. Modified Example
4. Third Embodiment
4-1. Configuration of Pico eNodeB
4-2. Configuration of UE
4-3. Signal Quality Measurement
4-4. Operation of Communication System
5. Concluding Remarks

1. BASIC CONFIGURATION OF COMMUNICATION SYSTEM

FIG. 1 is an explanatory diagram illustrating a configuration of a communication system according to an embodiment of the present disclosure. As illustrated in FIG. 1, a communication system according to an embodiment of the present disclosure includes a plurality of eNodeBs 10, a plurality of user equipment devices (UEs) 20, and a plurality of pico eNodeBs 30.

The eNodeB 10 is a radio base station that communicates with the UE 20 included in a cell provided by the eNodeB 10, that is, coverage of the eNodeB 10 (in this specification, unless specifically described otherwise, the eNodeB 10 represents a macro eNodeB). The eNodeB 10 has enough high power output to form a cell of several km to about 10 km. Also, each eNodeB 10 is connected through a cable, called an X2 interface, and may communicate control data or user data with other eNodeBs 10 through the X2 interface.

The pico eNodeB 30 is a low-transmission-power type communication control apparatus that has a transmission power lower than that of the eNodeB 10 by, for example, about 10 dB. Therefore, the pico eNodeB 30 forms a smaller cell than the eNodeB 10 within a cell formed by the eNodeB 10. The pico eNodeB 30 controls communication with the UE 20 belonging to the pico eNodeB 30. Also, the pico eNodeB 30 is connected to the eNodeB 10 by the X2 interface, and may communicate control data or user data with the eNodeB 10 through the X2 interface.

The UE 20 is a communication terminal that performs reception processing in a resource block for downlink allocated by a base station, such as the eNodeB 10 or the pico eNodeB 30, and performs transmission processing in a resource block for uplink. In the example illustrated in FIG. 1, the UE 20A belongs to the eNodeB 10A and performs uplink communication and downlink communication with the eNodeB 10A. Also, the UE 20B belongs to the pico eNodeB 30 and performs uplink communication and downlink communication with the pico eNodeB 30.

The UE 20, for example, may be a smart phone or may be an information processing device, such as a personal computer (PC), a household image processing device (DVD recorder, video deck, or the like), a personal digital assistant (PDA), a household game apparatus, a household appliance, or the like. Also, the UE 20 may be a mobile communication device, such as a portable phone, a personal handyphone system (PHS), a portable music reproduction device, a portable video processing device, a portable game apparatus, or the like.

(Frame Configuration)

Next, a radio frame shared between a base station such as the above-described eNodeB 10 and the UE 20 will be described.

Figure 2:
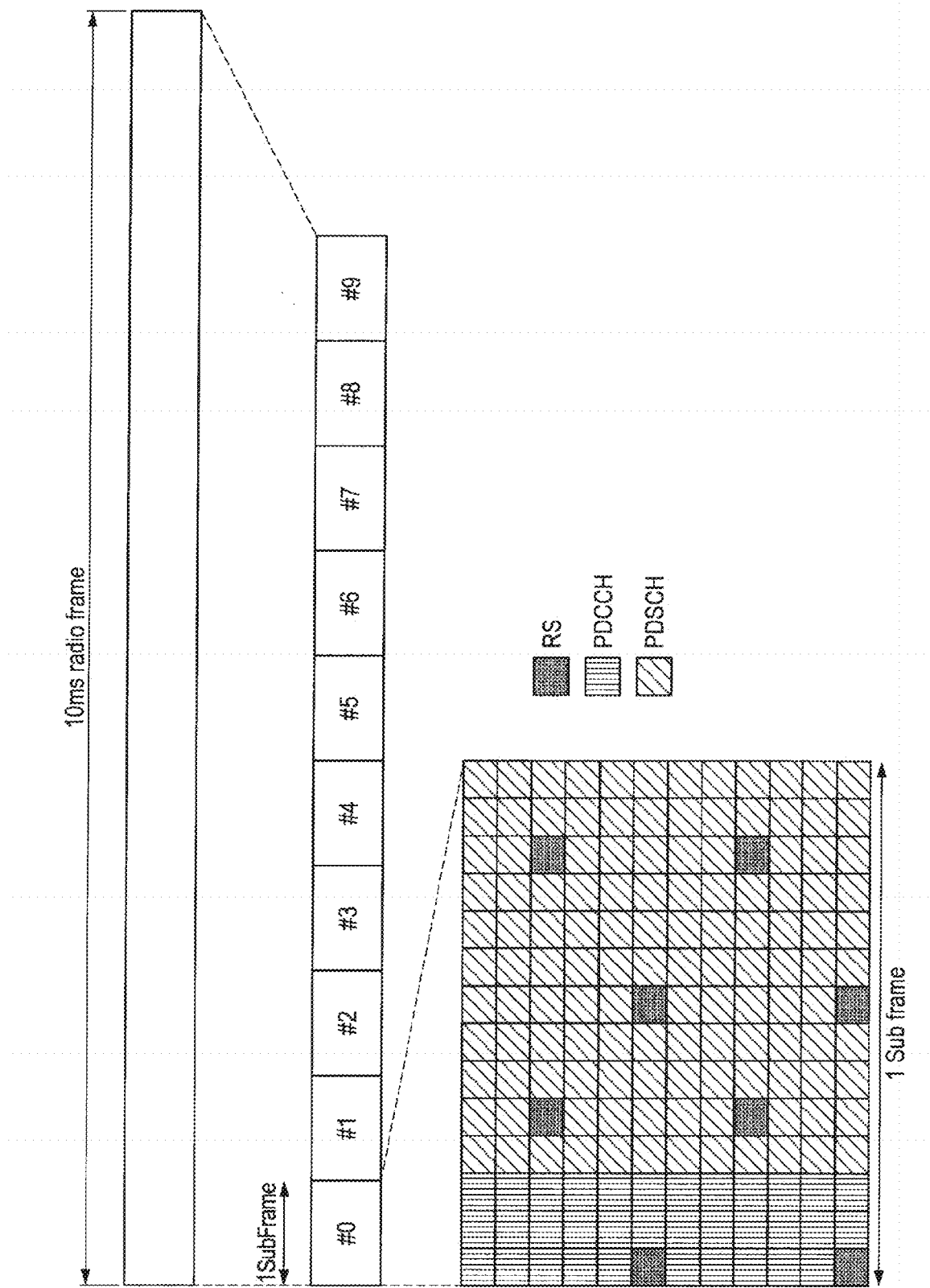
FIG. 2 is an explanatory diagram illustrating a 4G frame format.

FIG. 2 is an explanatory diagram illustrating a 4G frame format. As illustrated in FIG. 2, a 10-ms radio frame includes ten 1-ms subframes #0 to #9. Each subframe is a single resource block including 12 sub carriers X 14 orthogonal frequency division multiplexing (OFDM) symbols, and scheduling allocation is performed in units of resource blocks. Also, 1 OFDM symbol is a unit that is used in an OFDM modulation based communication scheme, and is a unit that outputs data processed in one Fast Fourier Transform (FFT).

Also, as illustrated in FIG. 2, each subframe includes a control area and a data area. The control area includes the leading 1 to 3 OFDM symbols (FIG. 2 illustrates an example in which the control area is 3 OFDM symbols), and is used for transmission of a control signal, called a Phy DownLink Control Channel (PDCCH). Also, the data area following the control area is used for transmission of user data or the like, called a Phy DownLink Shared Channel (PDSCH).

Also, in the control area and the data area, a cell-specific reference signal (RS) is arranged. The UE 20 may perform channel estimation by receiving the reference signal, and may perform decoding processing of the PDSCH or the like, based on the result of the channel estimation.

(Range Expansion)

Incidentally, the UE 20 performs measurement of received power, and basically determines a base station having the highest received power as a connection destination. However, as described above, the pico eNodeB 30 has a transmission power lower than that of the eNodeB 10. For this reason, in the measurement by the UE 20, even when the UE 20 is located close to the pico eNodeB 30, the received power of the eNodeB 10 is frequently high. As a result, the opportunity for the UE 20 to belong to the pico eNodeB 30 is reduced.

To solve such a problem, range expansion technology has been conceived. Range expansion is technology for expanding the cell of the pico eNodeB 30. Specifically, range expansion is technology that considers the received power of the pico eNodeB 30 as a value greater than an actual measured value by about 20 dB when the UE 20 performs the measurement.

Figure 3:
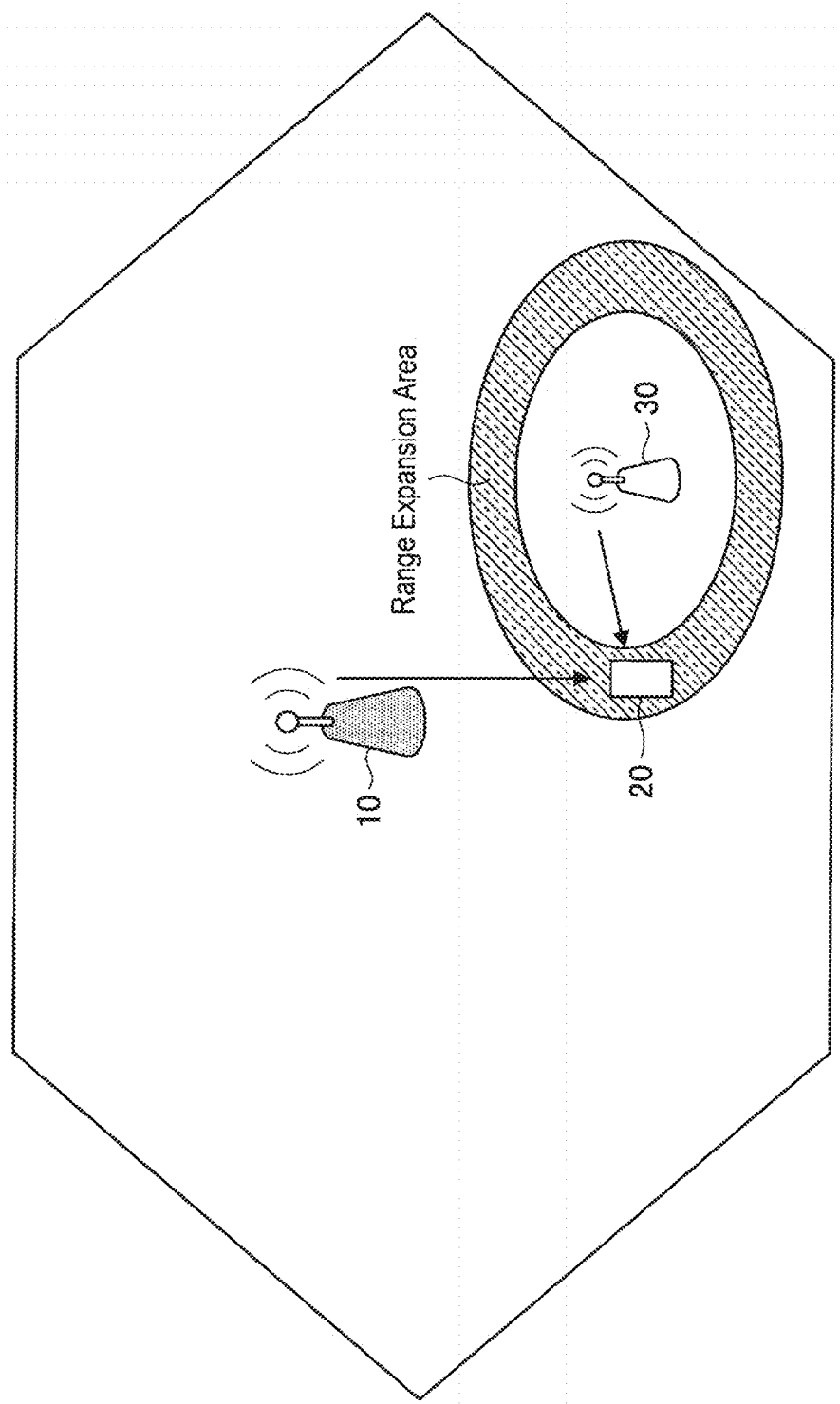
FIG. 3 is an explanatory diagram illustrating a range expansion area of a pico eNodeB 30.

FIG. 3 is an explanatory diagram illustrating the range expansion area of the pico eNodeB 30. Through range expansion, the cell of the pico eNodeB 30 is expanded up to the range expansion area illustrated in FIG. 3. By such a configuration, the opportunity for the UE 20 to belong to the pico eNodeB 30 may be increased.

On the other hand, in the UE 20 that belongs to the pico eNodeB 30 and is located in the range expansion area, the received power from the eNodeB 10 may be higher than that of the pico eNodeB 30 by about 20 dB. For this reason, it is important to appropriately control interference from the eNodeB 10. Hereinafter, interference control of the data area to which the PDSCH is transmitted, and interference control of the control area to which the PDCCH is transmitted will be described.

(Interference Control of Data Area)

Inter-Cell Interference Coordination (ICIC) makes it possible to cope with the interference of the data area. Specifically, the eNodeB 10 may control the interference of the data area in units of resource blocks by exchanging information of a resource block having great interference or a resource block expected to have great interference with the neighboring eNodeBs 10 through the X2 interface. On the other hand, in ICIC, the transmission of the PDCCH is not stopped, and therefore, it has been difficult to use ICIC to avoid the interference of the control area.

(Interference Control of Control Area—ABS)

For this reason, Almost Blank Subframe (ABS) has been employed for the interference control of the control area. ABS limits transmission other than the reference signal from the macro eNodeB in some subframes. A subframe set as an ABS becomes a transmission limit frame in which transmission other than the reference signal is limited. Hereinafter, ABS will be described in more detail with reference to FIG. 4.

Figure 4:
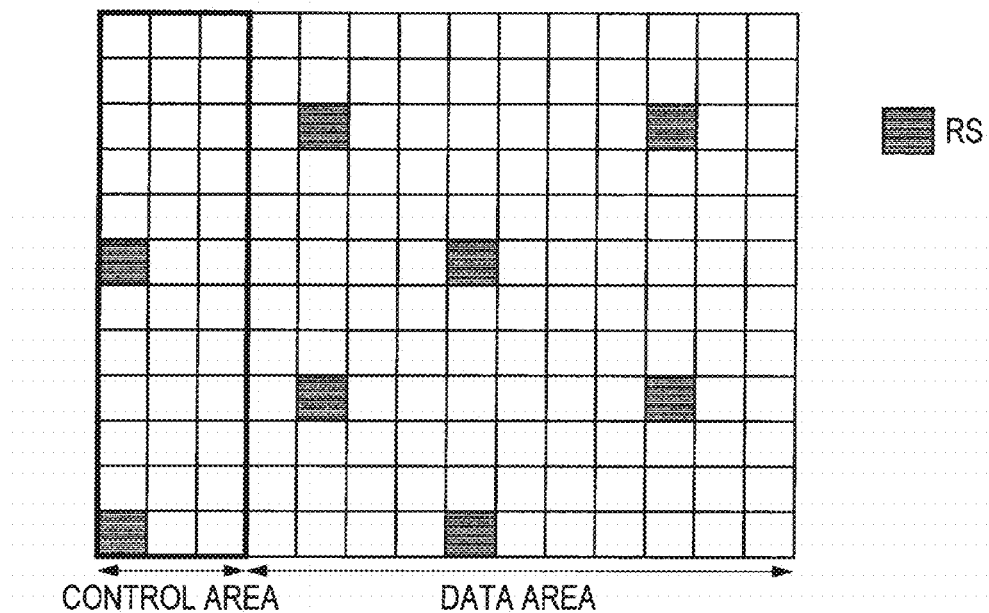
FIG. 4 is an explanatory diagram illustrating a subframe set as an ABS.

FIG. 4 is an explanatory diagram illustrating the subframe set as the ABS. As illustrated in FIG. 4, in the subframe set as the ABS, the PDCCH and the PDSCH are not transmitted, and the reference signal of the control area and the reference signal of the data area are transmitted. Therefore, in the subframe set as the ABS by the eNodeB 10, the interference of both of the control area and the data area of the pico eNodeB 30 is suppressed.

Figure 5:
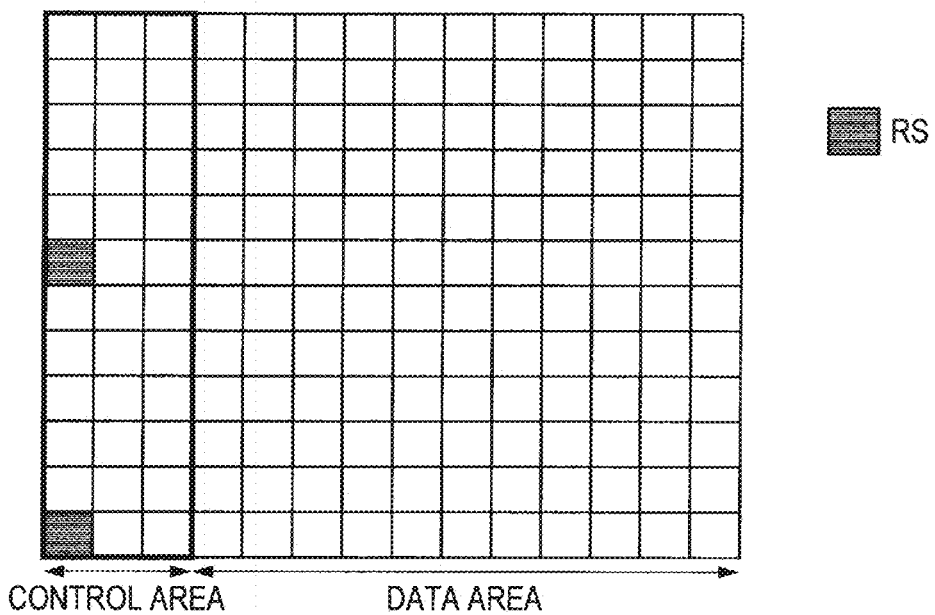
FIG. 5 is an explanatory diagram illustrating a subframe set as an MBSFN type ABS.

Also, ABSs include Multimedia Broadcast multicast Single Frequency Network (MBSFN) type ABSs. In a subframe set as an MBSFN type ABS, as illustrated in FIG. 5, the reference signal of the data area is not transmitted, and only the reference signal of the control area is transmitted. For this reason, in the subframe set as the MBSFN type ABS, the interference of the pico eNodeB 30 is suppressed more than in the general ABS illustrated in FIG. 4.

(Setting Pattern of ABSs)

As the setting pattern of the ABSs, a plurality of configurations, the cycle of which is eight subframes, are defined. Hereinafter, specific examples of the configurations will be described with reference to FIG. 6.

Figure 6:
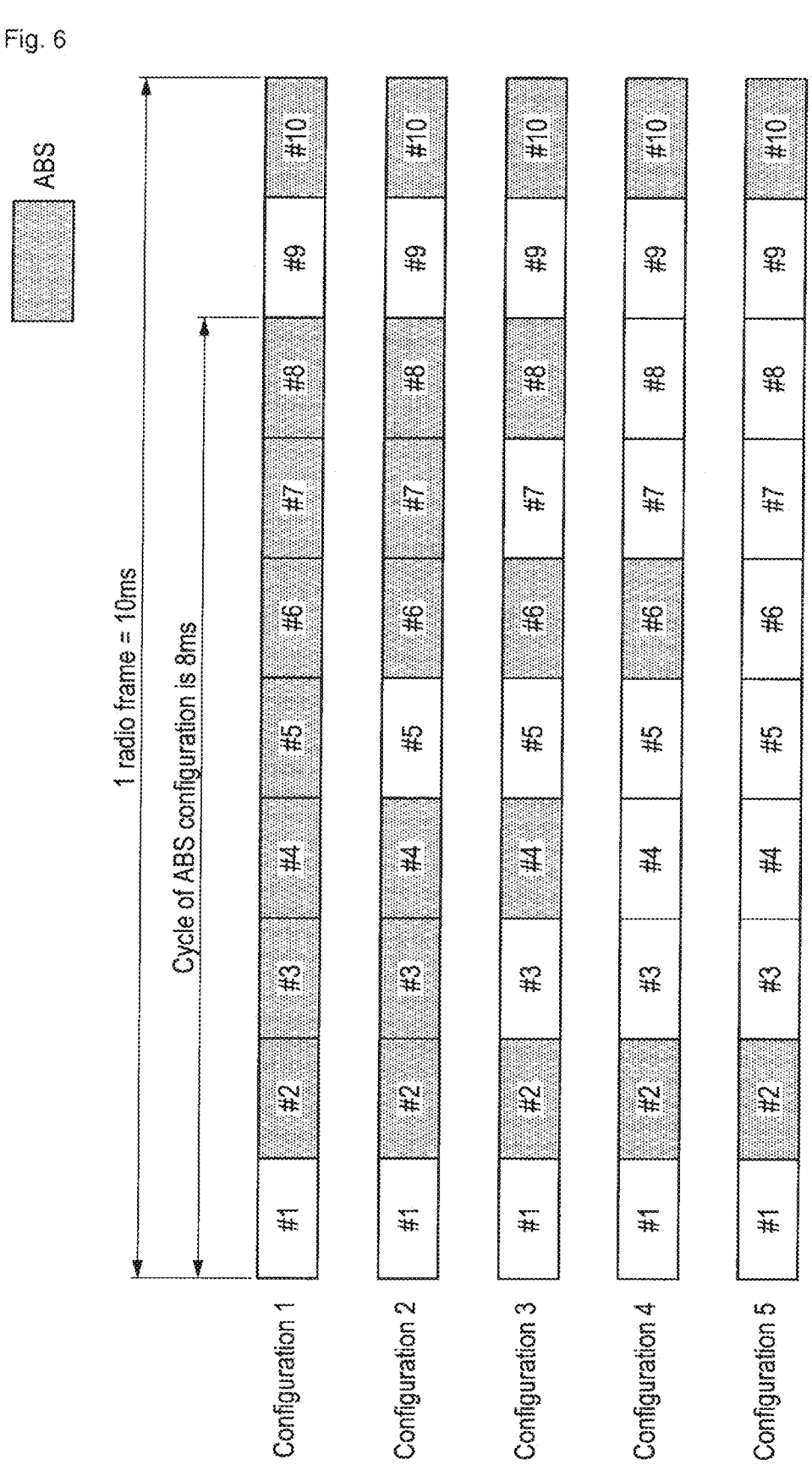
FIG. 6 is an explanatory diagram illustrating specific examples of configurations.

FIG. 6 is an explanatory diagram illustrating specific examples of configurations. As illustrated in FIG. 6, in a configuration 1, a first subframe is not set as an ABS, and the ABSs are set to second to eighth subframes. Also, in a configuration 2, first and fifth subframes are not set as ABSs, and the ABSs are set to the second to fourth subframes and sixth to eighth subframes. In a similar manner, in configurations 3 to 5, the ABSs are set according to patterns having cycles of 8 ms.

Also, although 1 radio frame is 10 ms, since the cycle of a hybrid ACK is 8 ms, the cycle of the configuration was also determined as 8 ms in terms of consistency with the hybrid ACK.

(Multiple_ABS)

So far, in the neighboring eNodeBs 10, setting the same configuration among the configurations has been considered. For example, in the example illustrated in FIG. 1, the subframe set as the ABS by the eNodeB 10A was also considered to be set as the ABS by the eNodeBs 10B and 10C. For this reason, in the subframe set as the ABS by the eNodeB 10A, the UE 20B located near the cell boundary of the eNodeB 10A received less interference from the neighboring eNodeBs 10B and 10C.

However, multiple_ABS technology for permitting the setting of different configurations between the neighboring eNodeBs 10 has recently been discussed. Taking this into consideration, an appropriate number of subframes set as the ABSs by the eNodeB 10 will be different. In other words, while the eNodeB 10, to which a large number of pico eNodeBs 30 belong, has to set a large number of subframes as the ABSs, the eNodeB 10, to which a small number of pico eNodeBs 30 belong, will have less of a need to set a large number of subframes as the ABSs.

Due to this introduction of the multiple_ABS, macro eNodeBs setting the same subframe as the ABS and macro eNodeBs not setting the same subframe as the ABS are mixed among a plurality of neighboring macro eNodeBs. For example, in a case in which the eNodeB 10A illustrated in FIG. 1 sets the configuration 2 and the eNodeB 10B sets the configuration 5, the subframe #3 in the eNodeB 10A is an ABS, but the subframe #3 in the eNodeB 10B is not an ABS. For this reason, the UE 20B located near the cell boundary of the eNodeB 10A may receive interference from the eNodeB 10B in the subframe #3.

Second Embodiment

Background of First Embodiment

As described above, when only the configuration of the eNodeB 10, to which the pico eNodeB 30 belongs, is considered by the introduction of the multiple_ABS, it is difficult for the pico eNodeB 30 to avoid the interference.

For this reason, while a plurality of eNodeBs 10 notifying the pico eNodeB 30 of each configuration may be considered, such notification leads to an increase in the load of the X2 interface to the pico eNodeB 30. Also, since the pico eNodeB 30 basically has the X2 interface with one eNodeB 10, it is appropriate for one eNodeB 10 to notify of the configuration.

Also, in the discussions so far, sharing one configuration between the eNodeB 10 and the pico eNodeB 30 through the X2 interface has been considered. Therefore, in terms of backward compatibility, it is undesirable to notify the pico eNodeB 30 of a plurality of configurations of a plurality of eNodeBs 10.

Therefore, based on the above circumstances, the first embodiment of the present disclosure was created. According to the first embodiment of the present disclosure, even when the multiple_ABS is introduced, a protection status from the interference of each subframe may be appropriately determined. Hereinafter, the first embodiment of the present disclosure will be described in detail.

2-1. Configuration of eNodeB According to First Embodiment

Figure 7:
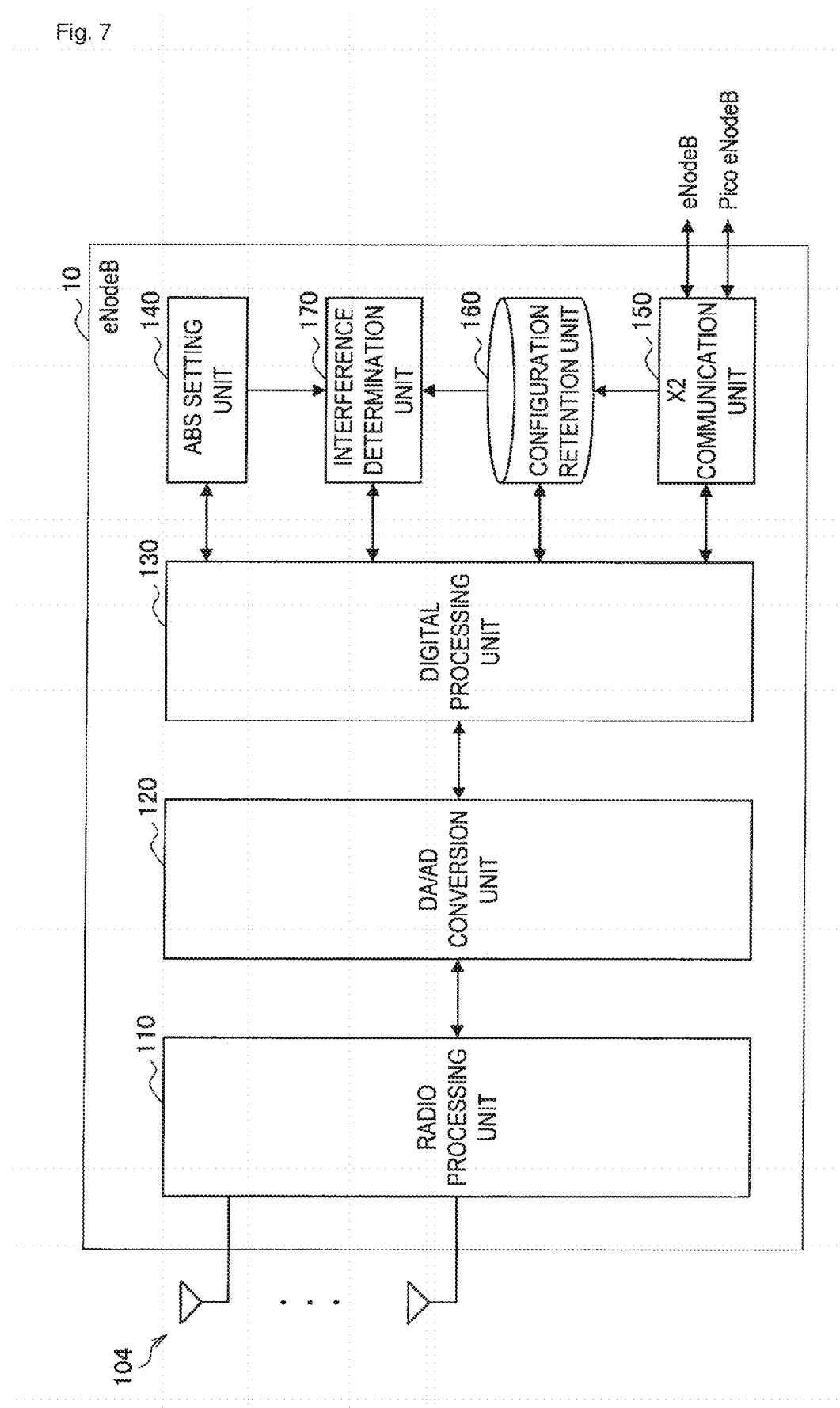
FIG. 7 is a functional block diagram illustrating a configuration of an eNodeB according to a first embodiment of the present disclosure.

FIG. 7 is a functional block diagram illustrating the configuration of the eNodeB 10 according to the first embodiment of the present disclosure. As illustrated in FIG. 7, the eNodeB 10 according to the first embodiment of the present disclosure includes an antenna group 104, a radio processing unit 110, a DA/AD conversion unit 120, a digital processing unit 130, an ABS setting unit 140, an X2 communication unit 150, a configuration retention unit 160, and an interference determination unit 170.

(Antenna Group)

The antenna group 104 acquires an electrical radio-frequency signal by receiving a radio signal from the UE 20, and provides the radio-frequency signal to the radio processing unit 110. Also, the antenna group 104 transmits the radio signal to the UE 20 based on the radio-frequency signal provided from the radio processing unit 110. Since the eNodeB 10 includes the antenna group 104 having a plurality of antennas, the eNodeB 10 may perform MIMO communication or diversity communication.

(Radio Processing Unit)

The radio processing unit 110 converts the radio-frequency signal, which is provided from the antenna group 104, into a baseband signal (uplink signal) by performing analog processing, such as amplification, filtering, and down-conversion. Also, the radio processing unit 110 converts a baseband signal (downlink signal), which is provided from the DA/AD conversion unit 120, into a radio-frequency signal.

(DA/AD Conversion Unit)

The DA/AD conversion unit 120 converts the analog-format uplink signal, which is provided from the radio processing unit 110, into a digital format, and provides the digital-format uplink signal to the digital processing unit 130. Also, the DA/AD conversion unit 120 converts the digital-format downlink signal, which is provided from the digital processing unit 130, into an analog format, and provides the analog-format downlink signal to the radio processing unit 110.

(Digital Processing Unit)

The digital processing unit 130 performs digital processing on the uplink signal provided from the DA/AD conversion unit 120, and detects control signal such as PUCCH, or user data such as PUSCH. Also, the digital processing unit 130 generates a digital-format downlink signal for transmission from the eNodeB 10, and provides the downlink signal to the DA/AD conversion unit 120.

(ABS Setting Unit)

The ABS setting unit 140 sets the ABS by the selection and setting of the configuration described with reference to FIG. 6.

(X2 Communication Unit)

The X2 communication unit 150 is configured to perform communication with another eNodeB 10 or the pico eNodeB 30 through the X2 interface. For example, the X2 communication unit 150 has a function as a setting information reception unit that receives setting information, that is, a configuration, of the ABS of the neighboring eNodeB 10. Also, the X2 communication unit 150 has a function as a notification unit that notifies the pico eNodeB 30 of information indicating a determination result of an interference protection status for each subframe by the interference determination unit 170.

(Configuration Retention Unit)

The configuration retention unit 160 retains the configurations of the neighboring eNodeBs 10 which are received by the X2 communication unit 150.

(Interference Determination Unit)

The interference determination unit 170 determines the interference protection status of the UE 20, which belongs to the pico eNodeB 30 within the cell of the eNodeB 10, at each subframe. Specifically, the interference determination unit 170 determines the interference protection status, based on the configuration which is set by the ABS setting unit 140 and the configuration of the neighboring eNodeB 10 which is retained in the configuration retention unit 160.

For example, in the subframe which is set as the ABS by both the eNodeB 10 including the target pico eNodeB 30 within the cell (hereinafter, when necessary, referred to as a serving eNodeB 10) and the neighboring eNodeBs 10, the communication of the UE 20 belonging to the pico eNodeB 30 is considered to receive less interference. Therefore, the interference determination unit 170 determines that the subframe set as the ABS by the serving eNodeB 10 and the neighboring eNodeBs 10 is a protected frame.

Also, in the subframe which is set as the ABS by neither the serving eNodeB 10 nor the neighboring eNodeBs 10, it is considered that the communication of the UE 20 belonging to the pico eNodeB 30 will receive interference from the plurality of eNodeBs 10. Therefore, the interference determination unit 170 determines that the subframe set as the ABS by neither the serving eNodeB 10 nor the neighboring eNodeBs 10 is an unprotected (Not Protected) frame.

Also, in the subframe which is set as the ABS by the neighboring eNodeBs 10 but is not set as the ABS by the serving eNodeB 10, it is highly likely that the communication of the UE 20 belonging to the pico eNodeB 30 will receive interference from the serving eNodeB 10. Therefore, the interference determination unit 170 may determine that the subframe which is set as the ABS by the neighboring eNodeBs 10 and is not set as the ABS by the serving eNodeB 10 is an unprotected frame.

Also, in the subframe which is set as the ABS by the serving eNodeB 10 but is not set as the ABS by the neighboring eNodeBs 10, it is likely that the communication of the UE 20 belonging to the pico eNodeB 30 will receive interference from the neighboring eNodeBs 10. In other words, the communication of the UE 20 belonging to the pico eNodeB 30 may receive strong or weak interference. Therefore, the interference determination unit 170 determines that the subframe which is set as the ABS by the serving eNodeB 10 and is not set as the ABS by the neighboring eNodeBs 10 is a partially protected (Partial Protected) frame, the interference status of which is uncertain.

Hereinafter, a specific example of the determination by the above-mentioned interference determination unit 170 will be described with reference to FIG. 8.

Figure 8:
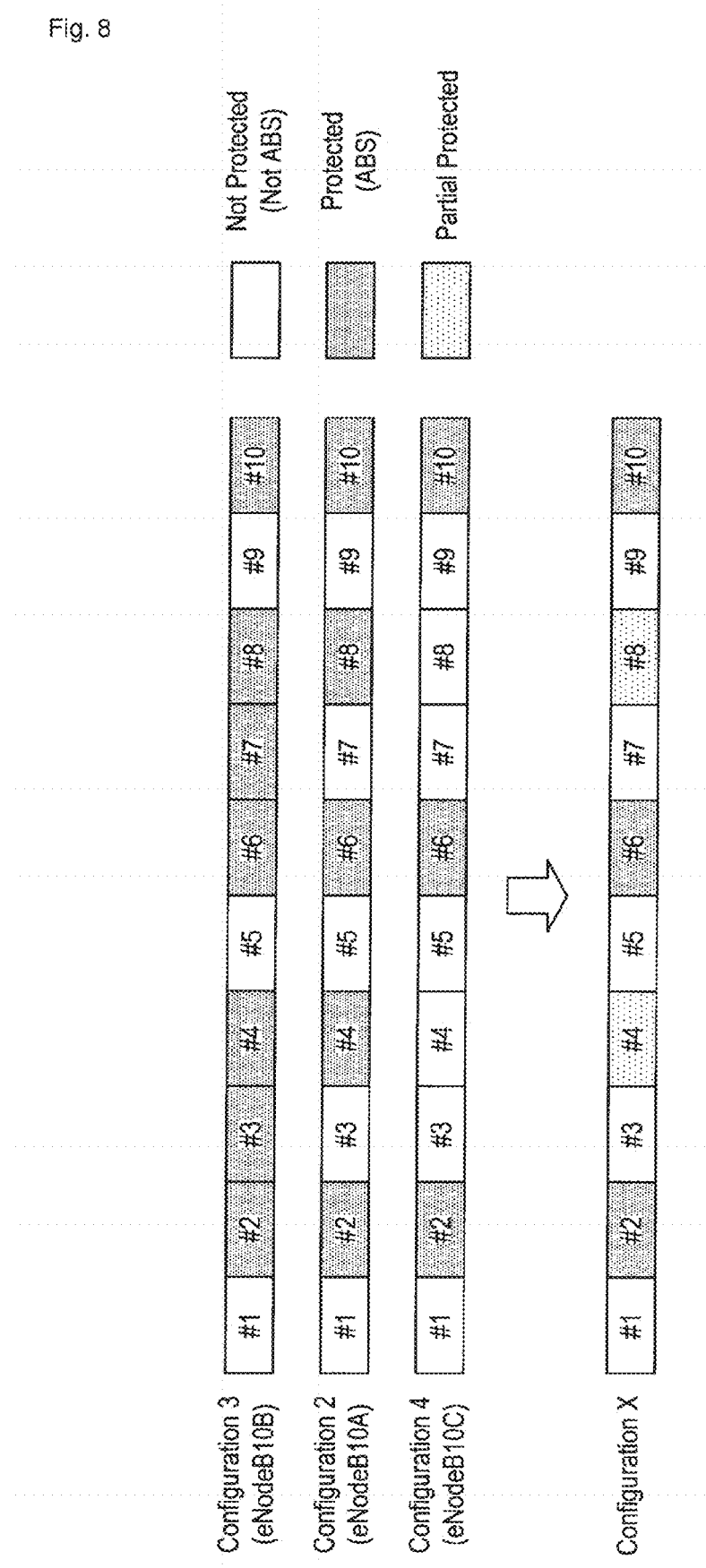
FIG. 8 is an explanatory diagram illustrating a specific example of a determination by an interference determination unit.

FIG. 8 is an explanatory diagram illustrating a specific example of the determination by the interference determination unit 170. More specifically, FIG. 8 illustrates an example in which the serving eNodeB 10A sets configuration 2, and the neighboring eNodeBs 10B and 10C set configurations 3 and 4, respectively.

In this case, since the subframes #2 and #6 are set as ABSs by all of the eNodeBs 10, the interference determination unit 170 determines that the subframes #2 and #6 are protected frames.

Also, since the subframes #1 and #5 are not set as ABSs by any of the eNodeBs 10, the interference determination unit 170 determines that the subframes #1 and #5 are unprotected frames.

Also, since the subframes #3 and #7 are subframes that are set as ABSs by the neighboring eNodeB 10B and are not set as ABSs by the serving eNodeB 10A, the interference determination unit 170 determines that the subframes #3 and #7 are unprotected frames.

Also, since the subframes #4 and #8 are subframes that are set as ABSs by the serving eNodeB 10 and are not set as ABSs by the neighboring eNodeBs 10, the interference determination unit 170 determines that the subframes #4 and #8 are partially protected frames.

When the interference determination unit 170 determines the interference protection status of each subframe as described above, the interference determination unit 170 specifies configuration X corresponding to the determination result. Herein, in the embodiment, the configuration defining a combination including the partially protected frames in the configurations 1 to 5 described with reference to FIG. 6 is added, and the interference determination unit 170 specifies the configuration X corresponding to the determination result from these configurations. The X2 communication unit 150 notifies the pico eNodeB 30 of the configuration X specified by the interference determination unit 170.

By this configuration, the pico eNodeB 30 may appropriately check the interference protection status of each subframe based on one configuration received from the serving eNodeB 10, without notifying the pico eNodeB 30 of the plurality of configurations of the plurality of eNodeBs 10.

2-2. Operation of eNodeB According to First Embodiment

The configuration of the eNodeB 10 according to the first embodiment of the present disclosure has been described above. Next, the operation of the eNodeB 10 according to the first embodiment of the present disclosure will be described with reference to FIG. 9.

Figure 9:
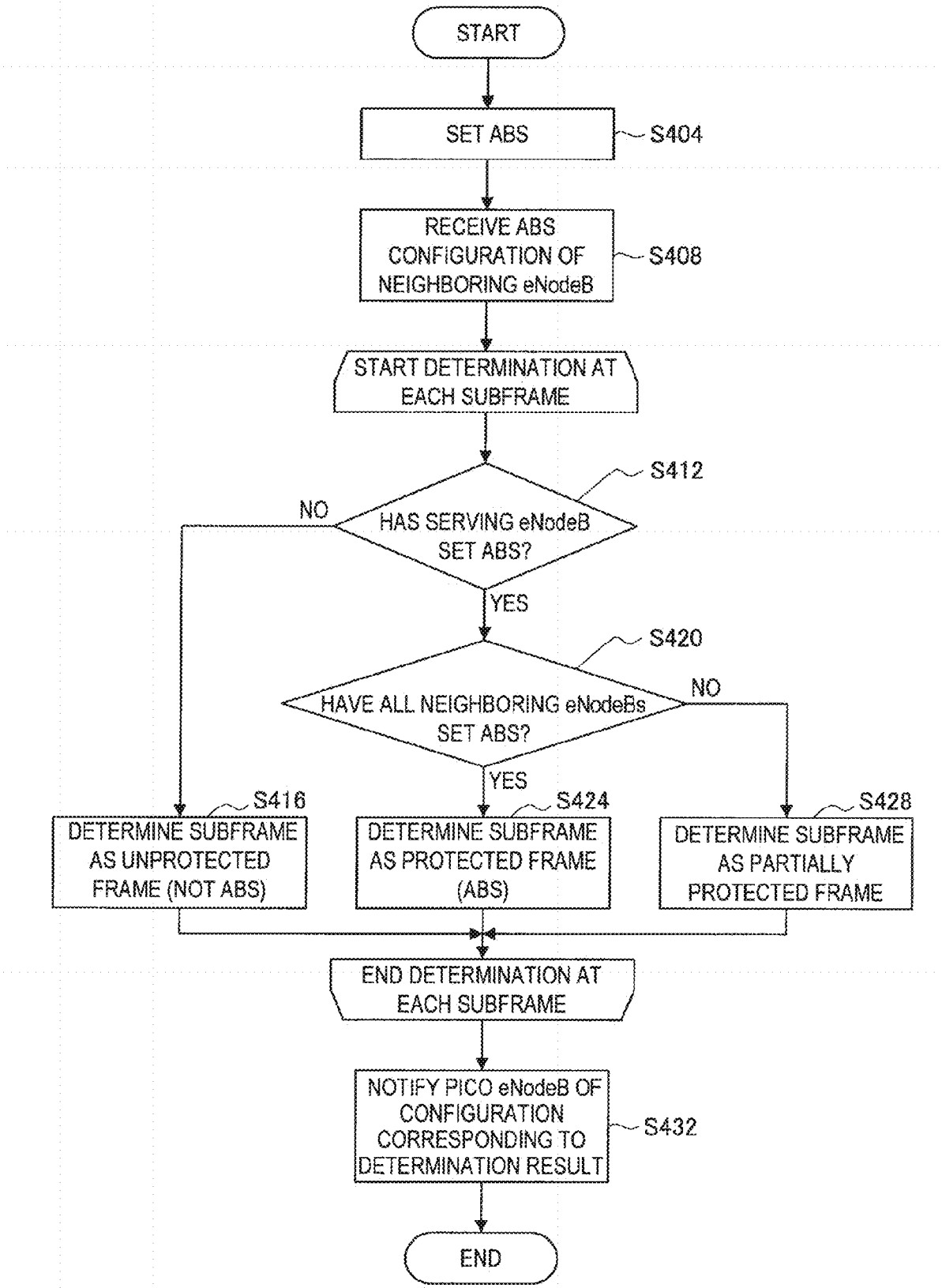
FIG. 9 is a flowchart illustrating an operation of an eNodeB according to a first embodiment of the present disclosure.

FIG. 9 is a flowchart illustrating the operation of the eNodeB 10 according to the first embodiment of the present disclosure. As illustrated in FIG. 9, first, the ABS setting unit 140 of the serving eNodeB 10 selects a configuration and sets an ABS (S404), and the X2 communication unit 150 receives a configuration of the neighboring eNodeB 10 (S408). After that, the interference determination unit 170 performs determinations indicated in S412 to S428 at each subframe.

Specifically, the interference determination unit 170 determines whether a target subframe is set as an ABS by the serving eNodeB 10 (S412). When the target subframe is not set as an ABS by the serving eNodeB 10, the interference determination unit 170 determines that the corresponding subframe is an unprotected frame (S416).

On the other hand, when the target subframe is set as an ABS by the serving eNodeB 10, the interference determination unit 170 determines whether the corresponding subframe is set as an ABS by all of the neighboring eNodeBs 10 (S420). When all of the neighboring eNodeBs 10 have set the corresponding subframe as an ABS, the interference determination unit 170 determines that the corresponding subframe is a protected frame (S424). On the other hand, when some of the neighboring eNodeBs 10 have not set the corresponding subframe as an ABS (S420), the interference determination unit 170 determines that the corresponding subframe is a partially protected frame (S428).

After that, the interference determination unit 170 specifies the configuration corresponding to the determination result of each subframe, and the X2 communication unit 150 notifies the pico eNodeB 30 of the specified configuration (S432).

Modified Example

Also, although the above description has been given of the example in which the subframe that is set as the ABS by the neighboring eNodeB 10 and is not set as the ABS by the serving eNodeB 10 is handled as the unprotected frame, the embodiment is not limited to this example. For example, the interference determination unit 170 may determine that the subframe which is set as the ABS by the neighboring eNodeB 10 and is not set as the ABS by the serving eNodeB 10 is a partially protected frame. Hereinafter, such a modified example will be described with reference to FIGS. 10 and 11.

Figure 10:
FIG. 10 is an explanatory diagram illustrating a modified example of a determination by an interference determination unit.

FIG. 10 is an explanatory diagram illustrating the modified example of the determination by the interference determination unit 170. More specifically, like in FIG. 8, FIG. 10 illustrates an example in which the serving eNodeB 10A sets configuration 2, and the neighboring eNodeBs 10B and 10C set configurations 3 and 4, respectively.

In this case, since the subframes #3 and #7 are subframes that are set as ABSs by the neighboring eNodeB 10B and are not set as ABSs by the serving eNodeB 10A, the interference determination unit 170 according to the modified example, as illustrated in FIG. 10, determines that the subframes #3 and #7 are partially protected frames. Also, since the determination results regarding the subframes #1, #2, #4-6, and #8 are the same as those described with reference to FIG. 8, a detailed description thereof will be omitted herein.

Figure 11:
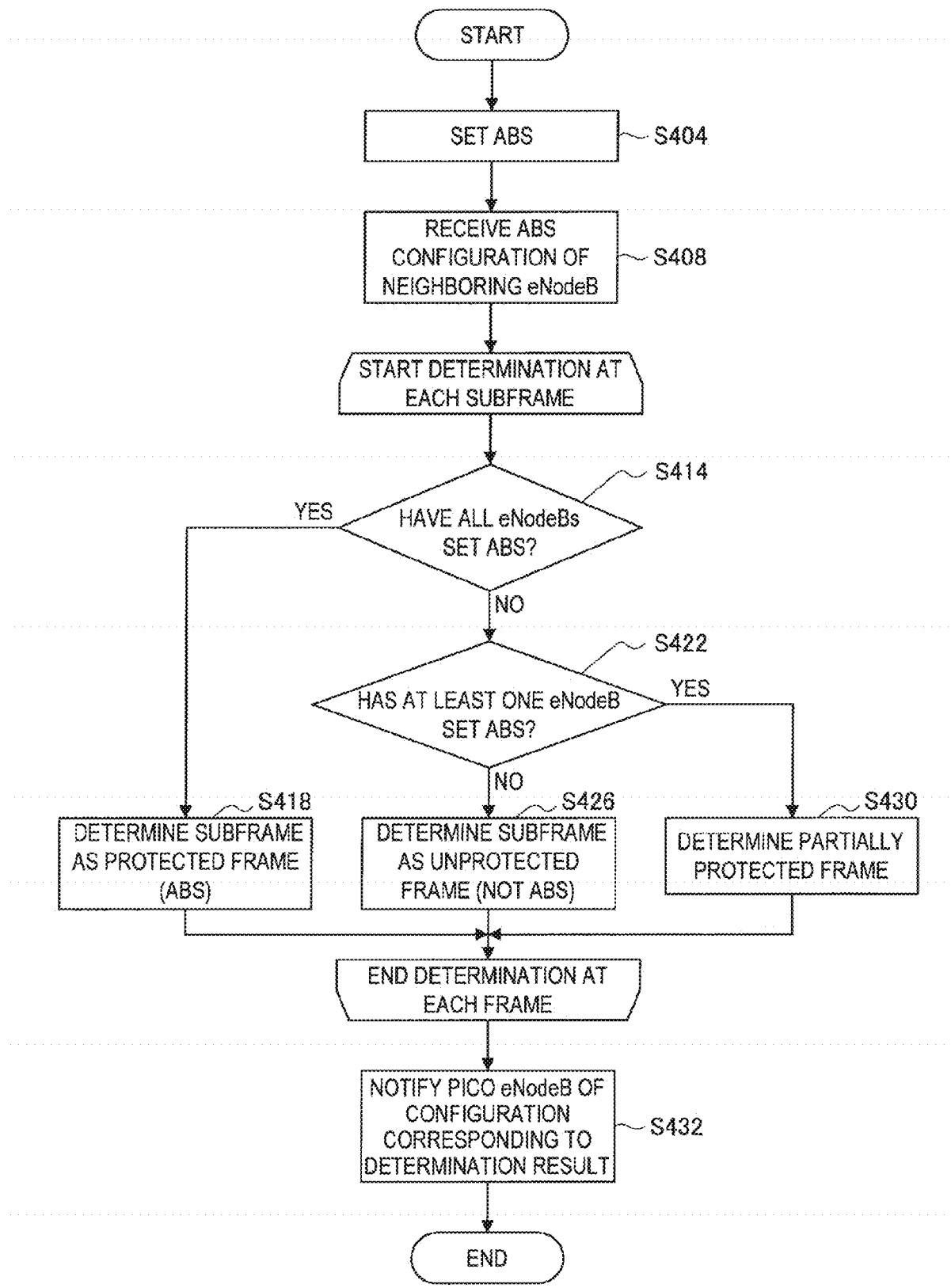
FIG. 11 is a flowchart illustrating an operation of an eNodeB according to the modified example.

FIG. 11 is a flowchart illustrating the operation according to the modified example. As illustrated in FIG. 11, first, the ABS setting unit 140 of the serving eNodeB 10 selects a configuration and sets an ABS (S404), and the X2 communication unit 150 receives a configuration of the neighboring eNodeB 10 (S408). After that, the interference determination unit 170 performs determinations indicated in S414 to S430 at each subframe.

Specifically, the interference determination unit 170 determines whether a target subframe is set as an ABS by all of the eNodeBs 10 including the serving eNodeB 10 and the neighboring eNodeB 10 (S414). When the target subframe is set as an ABS by all of the eNodeBs, the interference determination unit 170 determines that the corresponding subframe is a protected frame (S418).

On the other hand, the interference determination unit 170 determines whether the target subframe is set as an ABS by not all but some of the eNodeBs 10 (S422). When the target subframe is not set as an ABS by any of the eNodeBs 10, the interference determination unit 170 determines that the corresponding subframe is an unprotected frame (S426). On the other hand, when the target subframe is set as an ABS by some of the eNodeBs 10, the interference determination unit 170 determines that the corresponding subframe is a partially protected frame (S430).

After that, the interference determination unit 170 specifies the configuration corresponding to the determination result of each subframe, and the X2 communication unit 150 notifies the pico eNodeB 30 of the specified configuration (S432).

2-3. Application Example

As described above, according to the embodiment, since the pico eNodeB 30 is notified of the configuration indicating the partially protected frame having the probability of interference, the pico eNodeB 30, for example, may perform scheduling on the UE 20 located within the range expansion area, while avoiding the partially protected frame, in addition to the unprotected frame.

However, if the number of the partially protected frames increases, an amount of resources allocable by the pico eNodeB 30 is adversely affected. Therefore, a case in which the throughput of the pico eNodeB 30 is reduced may be presumed. Therefore, as the application example of the embodiment, a configuration for suppressing the number of partially protected frames will be described below.

The ABS setting unit 140 according to the application example sets the configuration at each sector of the eNodeB 10 in cooperation with the neighboring eNodeBs 10. Specifically, the ABS setting unit 140 of each of the plurality of neighboring eNodeBs 10 sets the same configuration to the sector directed to the central direction of the plurality of corresponding eNodeBs 10. Hereinafter, a further detailed description will be given with reference to FIG. 12.

Figure 12:
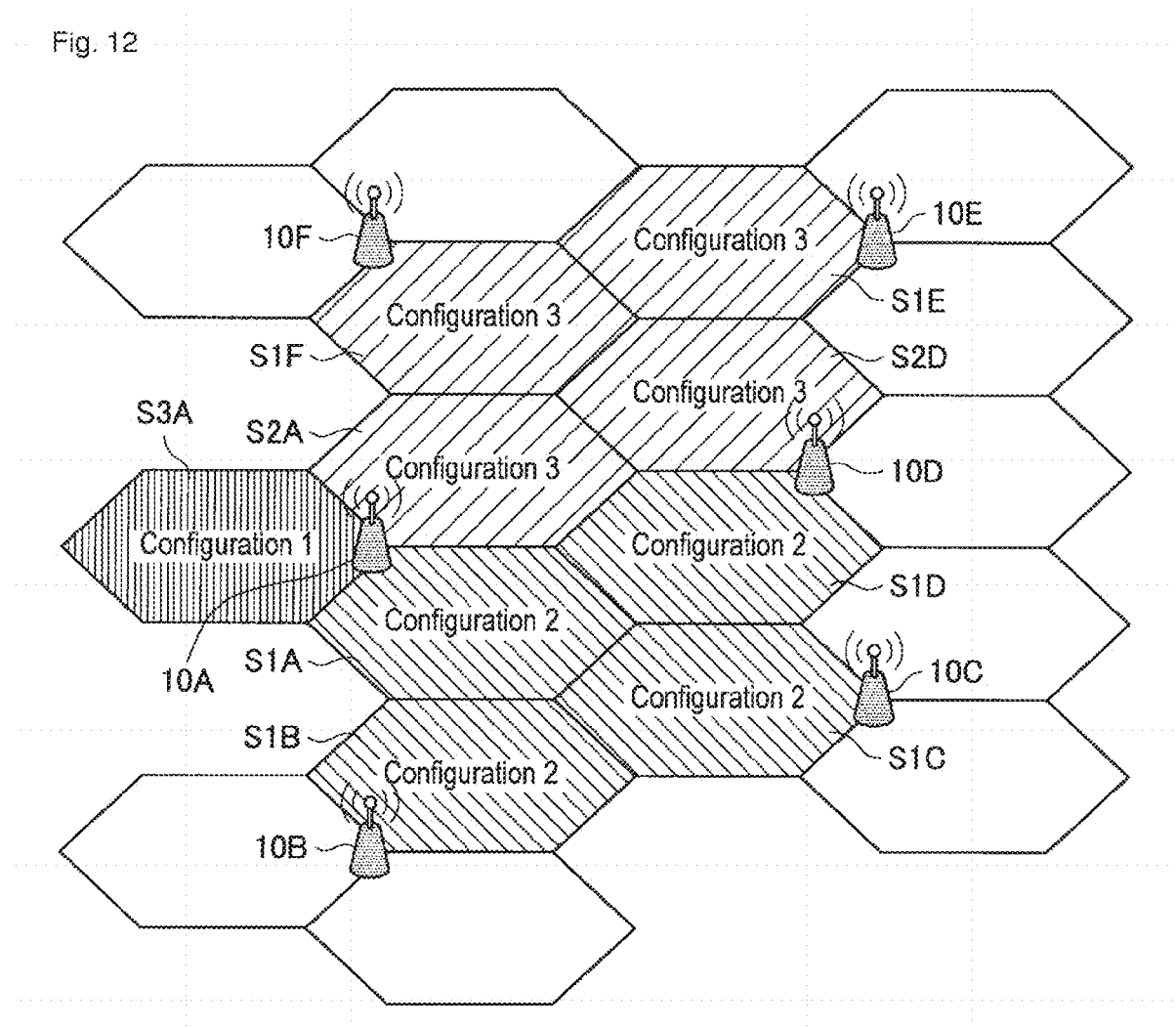
FIG. 12 is an explanatory diagram illustrating an application example of the first embodiment.

FIG. 12 is an explanatory diagram illustrating the application example of the first embodiment. As illustrated in FIG. 12, a sector of the eNodeB 10A that is directed in the central direction of the eNodeBs 10A to 10D is a first sector S1A. Also, a sector of the eNodeB 10B that is directed in the central direction of the eNodeBs 10A to 10D is a first sector S1B. Also, a sector of the eNodeB 10C that is directed in the central direction of the eNodeBs 10A to 10D is a first sector S1C. Likewise, a sector of the eNodeB 10D that is directed in the central direction of the eNodeBs 10A to 10D is a first sector S1D.

Therefore, the ABS setting units 140 of the eNodeBs 10A to 10D set the same configuration 2 for the first sector S1A of the eNodeB 10A, the first sector S1B of the eNodeB 10B, the first sector S1C of the eNodeB 10C, and the first sector S1D of the eNodeB 10D.

Likewise, the ABS setting units 140 of the eNodeBs 10A and 10D to 10F set the same configuration 3 for the first sector S2A of the eNodeB 10A, the first sector S2D of the eNodeB 10D, the first sector S1E of the eNodeB 10E, and the first sector S1F of the eNodeB 10F.

Herein, the interference determination unit 170 according to the application example determines interference based on the configuration set to the sector of each of the plurality of neighboring eNodeBs 10 which is directed in the central direction of the plurality of eNodeBs 10. For this reason, according to the application example in which the same configuration is set to these sectors, the mixture of the eNodeBs 10 setting the same subframe as an ABS and the eNodeBs 10 not setting the same subframe as an ABS may be avoided. Therefore, the number of partially protected frames may be suppressed. As a result, the throughput of the pico eNodeB 30 may be improved.

3. SECOND EMBODIMENT

The first embodiment of the present disclosure has been described above. Next, the second embodiment of the present disclosure will be described. According to the second embodiment, a configuration suitable for each pico eNodeB 30 may be obtained by determining configurations at each pico eNodeB 30 within an eNodeB 10-2.

3-1. Configuration of eNodeB According to Second Embodiment

Figure 13:
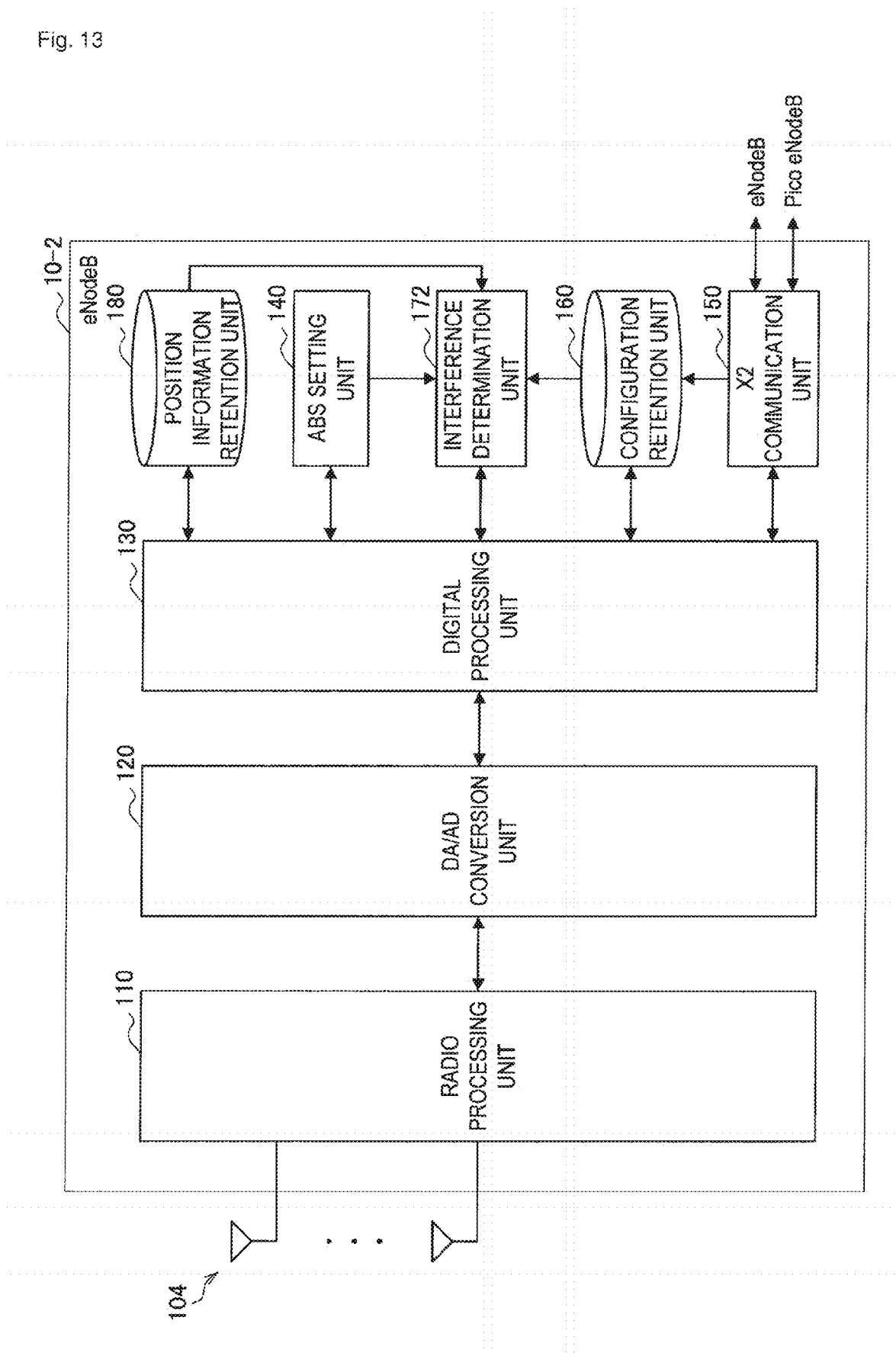
FIG. 13 is a functional block diagram illustrating a configuration of an eNodeB according to a second embodiment of the present disclosure.

FIG. 13 is a functional block diagram illustrating a configuration of an eNodeB 10-2 according to a second embodiment of the present disclosure. As illustrated in FIG. 13, an eNodeB 10-2 according to a second embodiment of the present disclosure includes an antenna group 104, a radio processing unit 110, a DA/AD conversion unit 120, a digital processing unit 130, an ABS setting unit 140, an X2 communication unit 150, a configuration retention unit 160, an interference determination unit 172, and a position information retention unit 180. Since the configurations of the antenna group 104, the radio processing unit 110, the DA/AD conversion unit 120, the digital processing unit 130, and the ABS setting unit 140 are the same as those described in the first embodiment, a detailed description thereof will be omitted herein.

(Position Information Retention Unit)

The position information retention unit 180 retains position information of the pico eNodeB 30 within the eNodeB 10-2. Also, the position information of each pico eNodeB 30 may be manually set and may be reported from the pico eNodeB 30.

(Interference Determination Unit)

The interference determination unit 172 determines configuration for notification at each pico eNodeB 30 based on the position information of each pico eNodeB 30 which is retained in the position information retention unit 180, in addition to configurations of a plurality of eNodeBs 10-2. Hereinafter, this point will be described in more detail with reference to FIG. 14.

Figure 14:
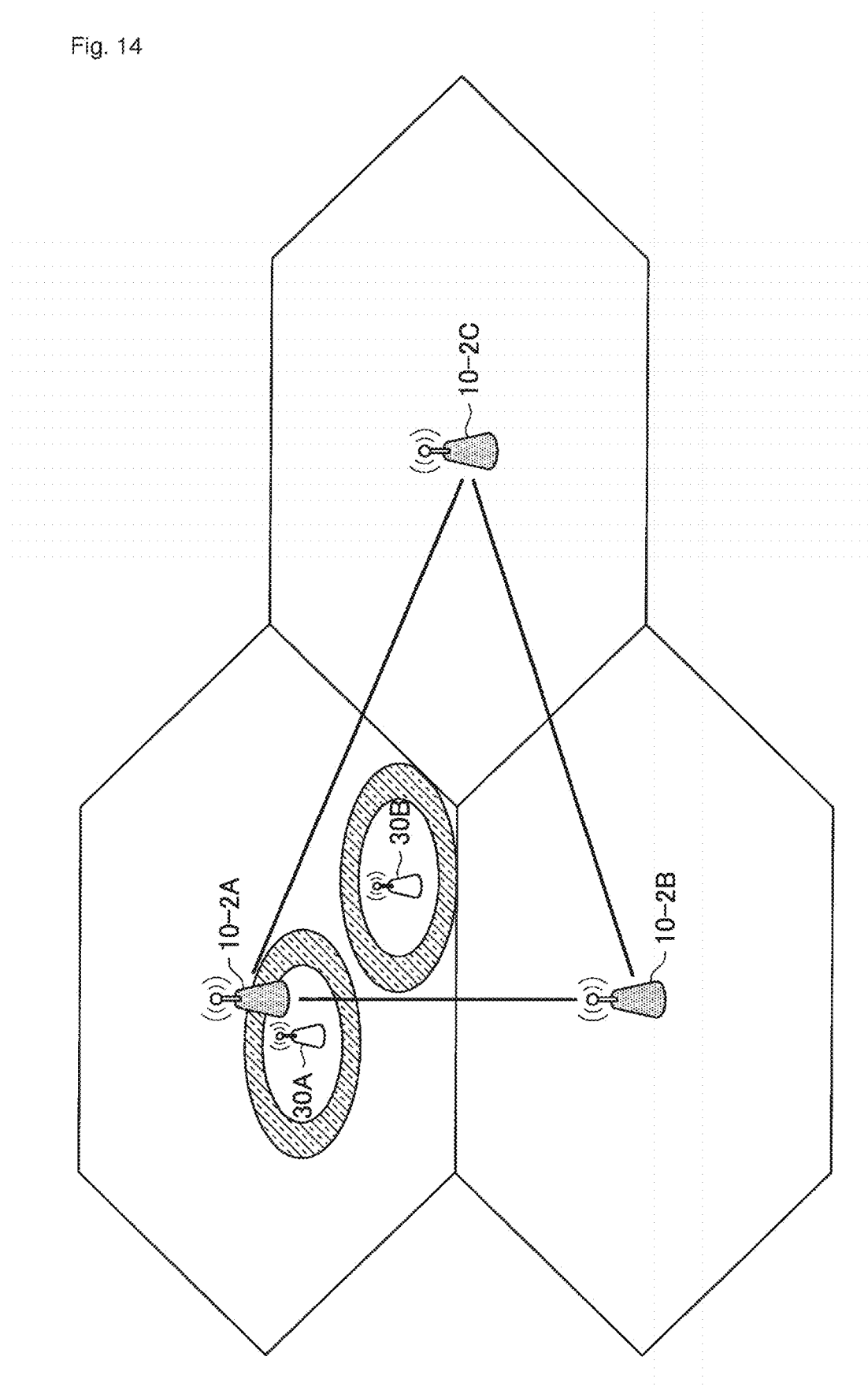
FIG. 14 is an explanatory diagram illustrating an example of an arrangement of an eNodeB and a pico eNodeB.

FIG. 14 is an explanatory diagram illustrating an example of an arrangement of the eNodeB 10-2 and the pico eNodeB 30. In the example illustrated in FIG. 14, the pico eNodeB 30A is located relatively near the eNodeB 10-2A, and the pico eNodeB 30B is located near the cell edge of the eNodeB 10-2A.

As such, if the position of each pico eNodeB 30 is different, the interference protection status of each pico eNodeB 30 is different even though the combination of the configurations of the respective eNodeBs 10-2 is identical. For example, the pico eNodeB 30A located relatively near the eNodeB 10-2A receives less interference from the neighboring eNodeBs 10-2B and 10-2C. On the other hand, the pico eNodeB 30B located near the cell edge of the eNodeB 10-2A is expected to receive a relatively large amount of interference from the neighboring eNodeBs 10-2B and 10-2C.

Therefore, when there is a non-uniform subframe that is set as an ABS by the serving eNodeB 10-2 and is not set as an ABS by the neighboring eNodeB 10-2, the interference determination unit 172 according to the second embodiment determines the interference protection status of the corresponding subframe based on the position information of each pico eNodeB 30.

Specifically, when the pico eNodeB 30 is within a predetermined range from the serving eNodeB 10-2, the interference determination unit 172 may determine that the non-uniform subframe is a protected frame. On the other hand, when the pico eNodeB 30 exists out of the predetermined range from the serving eNodeB 10-2, the interference determination unit 172 may determine that the non-uniform subframe is an unprotected frame.

According to this configuration, there is a merit in that it is unnecessary to add a configuration defining a combination including the partially protected frame. However, when the pico eNodeB 30 is within the predetermined range from the serving eNodeB 10-2 or outside of the predetermined range, the interference determination unit 172 may determine that the non-uniform subframe is a partially protected frame.

3-2. Operation of eNodeB According to Second Embodiment

The configuration of the eNodeB 10-2 according to the second embodiment of the present disclosure has been described above. Next, the operation of the eNodeB 10-2 according to the second embodiment of the present disclosure will be described with reference to FIG. 15.

Figure 15:
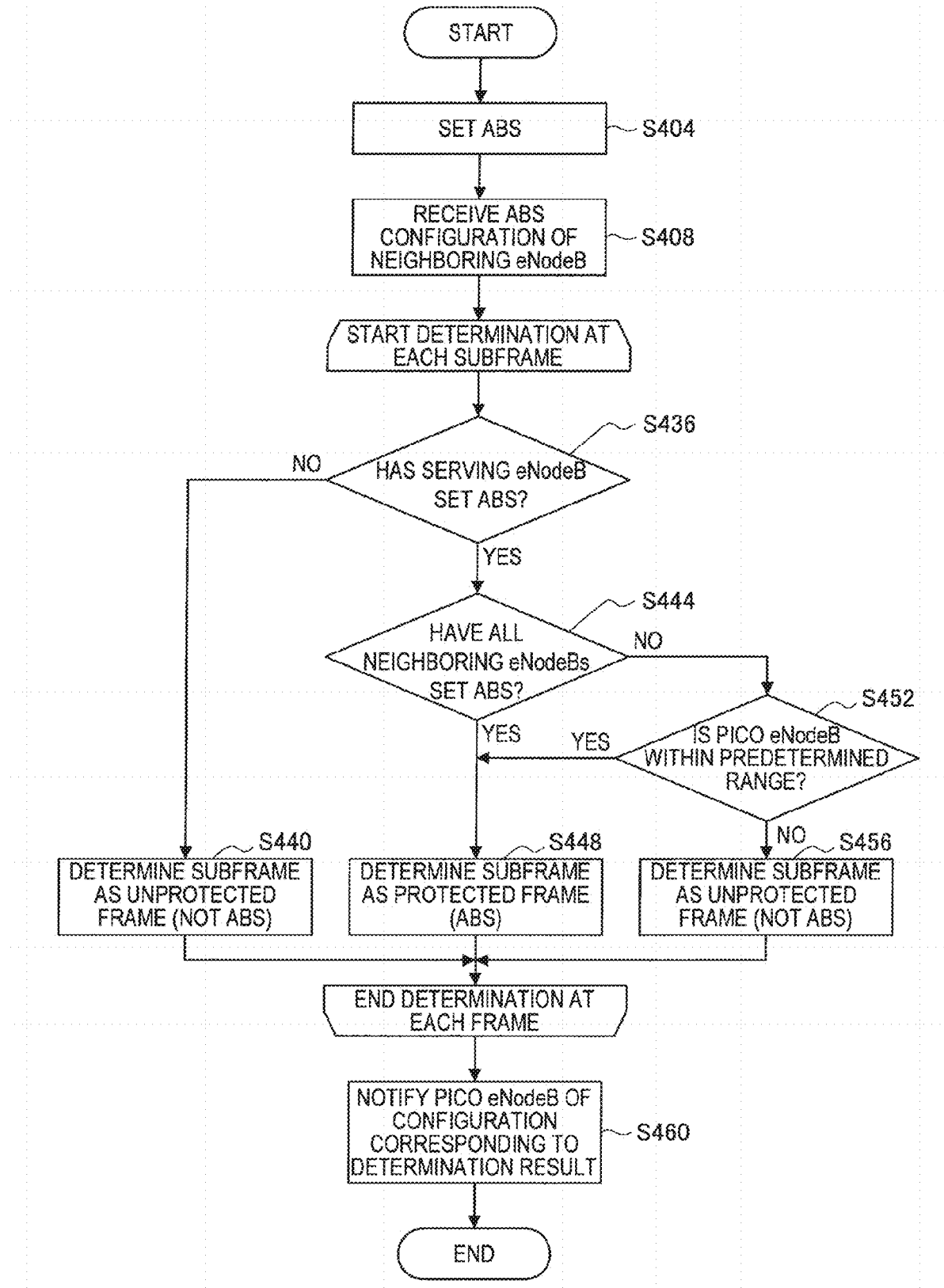
FIG. 15 is a flowchart illustrating an operation of an eNodeB according to a second embodiment of the present disclosure.

FIG. 15 is a flowchart illustrating the operation of the eNodeB 10-2 according to the second embodiment of the present disclosure. As illustrated in FIG. 15, first, the ABS setting unit 140 of the serving eNodeB 10-2 selects a configuration and sets an ABS (S404), and the X2 communication unit 150 receives a configuration of the neighboring eNodeB 10-2 (S408). After that, the interference determination unit 170 performs determinations indicated in S436 to S456 at each subframe.

Specifically, the interference determination unit 172 determines whether a target subframe is set as an ABS by the serving eNodeB 10-2 (S436). When the target subframe is not set as an ABS by the serving eNodeB 10-2, the interference determination unit 172 determines that the corresponding subframe is an unprotected frame (S440).

On the other hand, when the target subframe is set as an ABS by the serving eNodeB 10-2, the interference determination unit 172 determines whether the corresponding subframe is set as an ABS by all of the neighboring eNodeBs 10-2 (S444). When all of the neighboring eNodeBs 10-2 have set the corresponding subframe as an ABS, the interference determination unit 172 determines that the corresponding subframe is a protected frame (S448).

Herein, when some of the neighboring eNodeBs 10-2 have not set the corresponding subframe as an ABS (S444), the interference determination unit 172 determines whether the target pico eNodeB 30 is within a predetermined range from the serving eNodeB 10-2 (S452). When the target pico eNodeB 30 is within the predetermined range from the serving eNodeB 10-2, the interference determination unit 172 determines that the corresponding subframe is a protected frame (S448), and when outside of the predetermined range, the interference determination unit 172 determines that the corresponding subframe is an unprotected frame (S456).

After that, the interference determination unit 172 specifies the configuration corresponding to the determination result of each subframe, and the X2 communication unit 150 notifies the pico eNodeB 30 of the specified configuration (S460).

As described above, according to the second embodiment of the present disclosure, a configuration suitable for each pico eNodeB 30 may be obtained by determining configurations at each pico eNodeB 30 based on the position information of each pico eNodeB 30.

3-3. Modified Example

Also, although the above description has been given of the example in which the interference protection status is determined according to whether the pico eNodeB 30 is within the predetermined range from the serving eNodeB 10-2, the embodiment is not limited to this example. As the modified example, the interference determination unit 172 may determine the interference protection status based on the distance between the pico eNodeB 30 and the neighboring eNodeB 10-2.

As one example, the non-uniform subframe which is set as the ABS by the serving eNodeB 10-2 and is not set as the ABS by the neighboring eNodeB 10-2 is considered. In this case, as the distance between the pico eNodeB 30 and the neighboring eNodeB 10-2 is shorter, the pico eNodeB 30 receives more interference from the eNodeB 10-2 in the corresponding subframe.

Therefore, when the distance between the pico eNodeB 30 and the neighboring eNodeB 10-2 is less than a predetermined distance, the interference determination unit 172 may determine that the non-uniform subframe is an unprotected frame. On the other hand, when the distance between the pico eNodeB 30 and the neighboring eNodeB 10-2 is equal to or greater than the predetermined distance, the interference determination unit 172 may determine that the non-uniform subframe is a protected frame.

4. THIRD EMBODIMENT

The second embodiment of the present disclosure has been described above. Next, the third embodiment of the present disclosure will be described. According to the third embodiment of the present disclosure, when macro eNodeBs setting the same subframe as an ABS and macro eNodeBs not setting the same subframe as an ABS are mixed, the interference protection status of the corresponding subframe may be determined not on an eNodeB 10 side but on a pico eNodeB 30 side.

4-1. Configuration of Pico eNodeB

Figure 16:
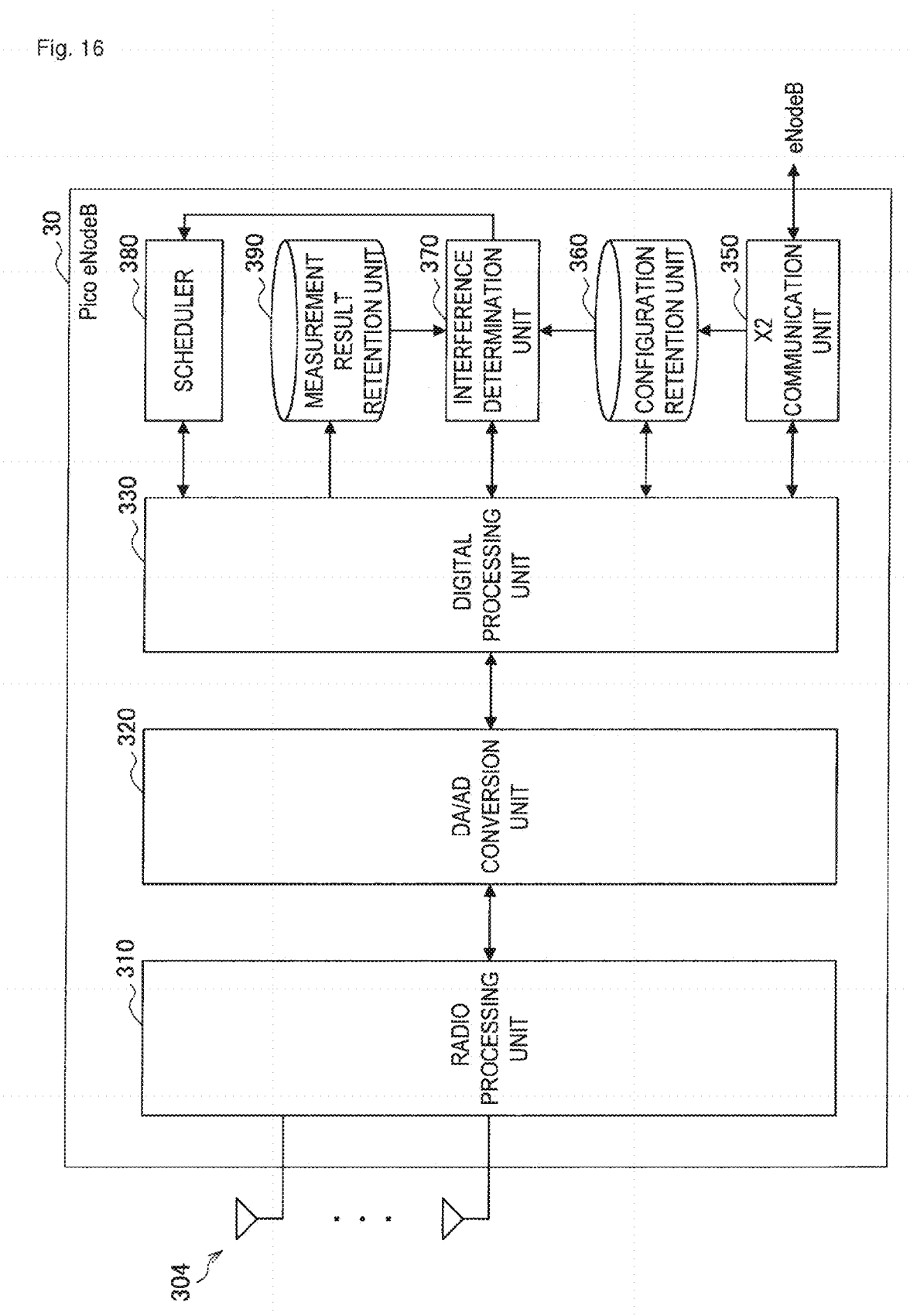
FIG. 16 is an explanatory diagram illustrating a configuration of a pico eNodeB according to a third embodiment of the present disclosure.

FIG. 16 is an explanatory diagram illustrating a configuration of a pico eNodeB 30 according to a third embodiment of the present disclosure. As illustrated in FIG. 16, a pico eNodeB 30 according to a third embodiment of the present disclosure includes an antenna group 304, a radio processing unit 310, a DA/AD conversion unit 320, a digital processing unit 330, an X2 communication unit 350, a configuration retention unit 360, an interference determination unit 370, a scheduler 380, and a measurement result retention unit 390.

(Antenna Group)

The antenna group 304 acquires an electrical radio-frequency signal by receiving a radio signal from the UE 20, and provides the radio-frequency signal to the radio processing unit 310. Also, the antenna group 304 transmits the radio signal to the UE 20, based on the radio-frequency signal provided from the radio processing unit 110. Since the pico eNodeB 30 includes the antenna group 304 having a plurality of antennas, the pico eNodeB 30 may perform MIMO communication or diversity communication.

(Radio Processing Unit)

The radio processing unit 310 converts the radio-frequency signal, which is provided from the antenna group 304, into a baseband signal (uplink signal) by performing analog processing, such as amplification, filtering, and down-conversion. Also, the radio processing unit 310 converts a baseband signal (downlink signal), which is provided from the DA/AD conversion unit 320, into a radio-frequency signal.

(DA/AD Conversion Unit)

The DA/AD conversion unit 320 converts the analog-format uplink signal, which is provided from the radio processing unit 310, into a digital format, and provides the digital-format uplink signal to the digital processing unit 330. Also, the DA/AD conversion unit 320 converts the digital-format downlink signal, which is provided from the digital processing unit 330, into an analog format, and provides the analog-format downlink signal to the radio processing unit 310.

(Digital Processing Unit)

The digital processing unit 330 performs digital processing on the uplink signal provided from the DA/AD conversion unit 320, and detects control signal such as PUCCH, or user data such as PUSCH. Also, the digital processing unit 330 generates a digital-format downlink signal for transmission from the pico eNodeB 30, and provides the downlink signal to the DA/AD conversion unit 320. The digital processing unit 330 operates as a communication unit together with the DA/AD conversion unit 320, the radio processing unit 310, and the antenna group 304.

(X2 Communication Unit)

The X2 communication unit 350 is configured to perform communication with the eNodeB 10 through the X2 interface. For example, the X2 communication unit 350 receives the notification of configuration information, which defines the combination of partially protected frames, from the eNodeB 10, as described in the first embodiment.

(Configuration Retention Unit)

The configuration retention unit 360 retains the configuration received from the pico eNodeB 30 by the X2 communication unit 350. The UE 20 receives the configuration transmitted through the antenna group 304, performs signal quality measurement according to the received configuration, and reports the measurement result to the pico eNodeB 30.

(Measurement Result Retention Unit)

The measurement result retention unit 390 retains the measurement result reported from the UE 20 as described below. Also, the UE 20 performing the measurement may be any one of UEs 20 belonging to the pico eNodeB 30 and may be a UE 20 located within the range expansion area.

(Interference Determination Unit)

The interference determination unit 370 determines, based on the measurement result of the UE 20, whether each partially protected frame is handled as a protected frame which is protected from interference or an unprotected frame which receives interference. This point will be described later with reference to FIGS. 18 and 19.

(Scheduler)

The scheduler 380 performs scheduling of the UE 20, which belongs to the pico eNodeB 30, according to the determination result by the interference determination unit 370 and the configuration retained by the configuration retention unit 360. For example, the scheduler 380 allocates only communication resources of protected frames to the UE 20 located within the range expansion area. By such a configuration, it is possible to prevent the UE 20 located within the range expansion area from receiving interference from the eNodeB 10.

4-2. Configuration of UE

The configuration of the pico eNodeB 30 according to the third embodiment of the present disclosure has been described above. Next, the configuration of the UE 20 according to the third embodiment of the present disclosure will be described.

Figure 17:
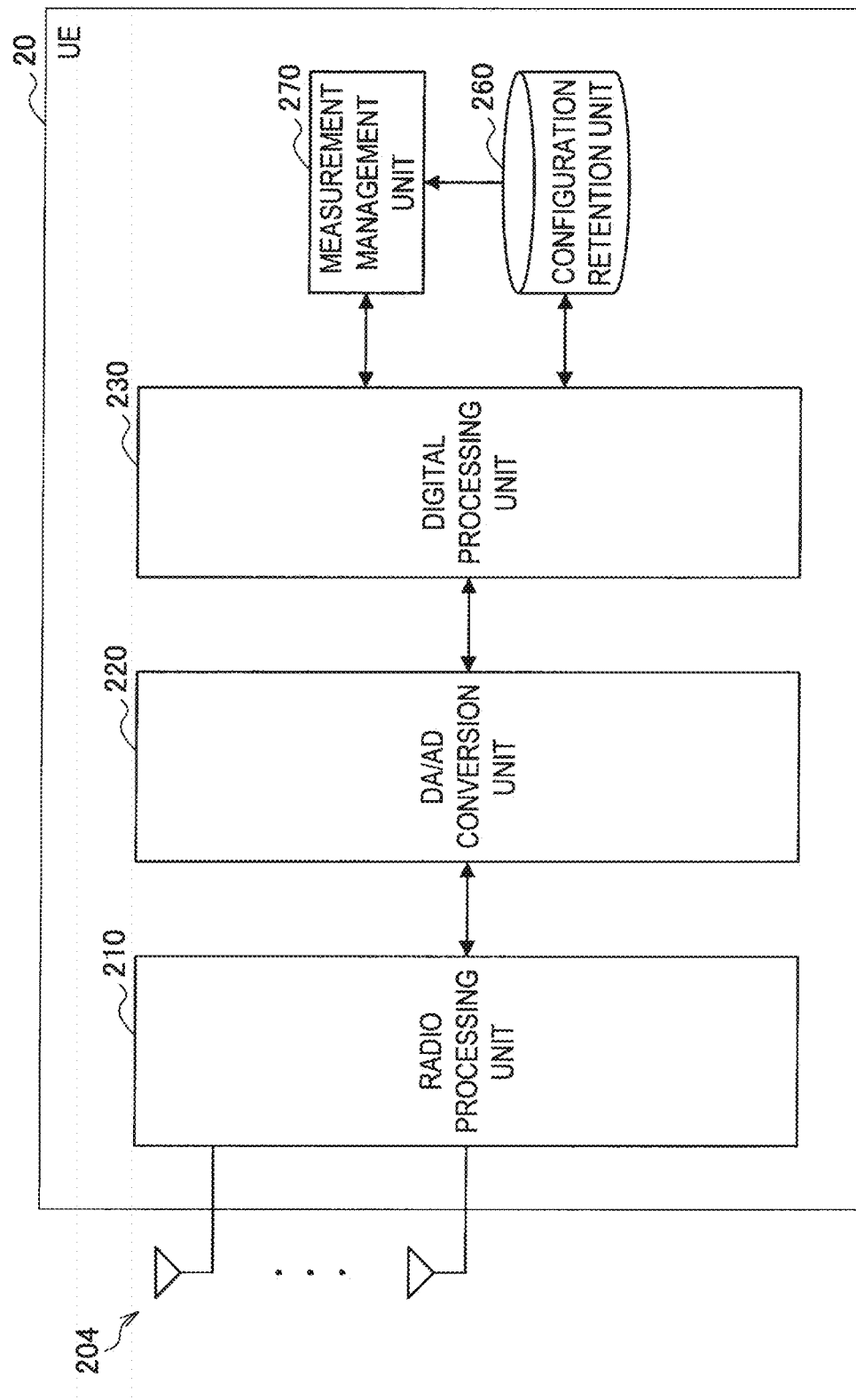
FIG. 17 is a functional block diagram illustrating a configuration of a UE 20 according to a third embodiment of the present disclosure.

FIG. 17 is a functional block diagram illustrating the configuration of the UE 20 according to a third embodiment of the present disclosure. As illustrated in FIG. 17, the UE 20 according to the third embodiment of the present disclosure includes an antenna group 204, a radio processing unit 210, a DA/AD conversion unit 220, a digital processing unit 230, a configuration retention unit 260, and a measurement management unit 270.

(Antenna Group)

The antenna group 204 acquires an electrical radio-frequency signal by receiving a radio signal from the eNodeB 10 or the pico eNodeB 30, and provides the radio-frequency signal to the radio processing unit 210. Also, the antenna group 204 transmits the radio signal to the eNodeB 10 or the pico eNodeB 30, based on the radio-frequency signal provided from the radio processing unit 210. Since the UE 20 includes the antenna group 204 having a plurality of antennas, the UE 20 may perform MIMO communication or diversity communication.

(Radio Processing Unit)

The radio processing unit 210 converts the radio-frequency signal, which is provided from the antenna group 204, into a baseband signal (downlink signal) by performing analog processing, such as amplification, filtering, and down-conversion. Also, the radio processing unit 210 converts a baseband signal (uplink signal), which is provided from the DA/AD conversion unit 220, into a radio-frequency signal.

(DA/AD Conversion Unit)

The DA/AD conversion unit 220 converts the analog-format downlink signal, which is provided from the radio processing unit 210, into a digital format, and provides the digital-format downlink signal to the digital processing unit 230. Also, the DA/AD conversion unit 220 converts the digital-format uplink signal, which is provided from the digital processing unit 230, into an analog format, and provides the analog-format uplink signal to the radio processing unit 210.

(Digital Processing Unit)

The digital processing unit 230 performs digital processing on the downlink signal provided from the DA/AD conversion unit 220, and detects control signal such as PDCCH, or user data such as PDSCH. Also, the digital processing unit 230 generates a digital-format uplink signal for transmission from the UE 20, and provides the uplink signal to the DA/AD conversion unit 220. The digital processing unit 230 operates as a communication unit together with the DA/AD conversion unit 220, the radio processing unit 210, and the antenna group 204.

(Configuration Retention Unit)

The configuration retention unit 260 retains the configuration received from the pico eNodeB 30. Also, the configuration represents whether each subframe is a protected frame (ABS), an unprotected frame (not ABS), or a partially protected frame.

(Measurement Management Unit)

The measurement management unit 270 manages the signal quality measurement according to the configuration retained in the configuration retention unit 260, and controls the report of the measurement result to the pico eNodeB 30. Hereinafter, the signal quality measurement will be described in more detail.

4-3. Signal Quality Measurement

When the subframe defined by the configuration is either of two types, the protected frame or the unprotected frame, the UE 20 performs two types of measurement. In other words, the measurement management unit 270 averages the measurement results of the plurality of protected frames, averages the measurement results of the plurality of unprotected frames, and reports the average value of the protected frames and the average value of the unprotected frames to the pico eNodeB 30 as the measurement result.

On the other hand, since each of the partially protected frames is considered to be different in the degree of interference by the combination of the eNodeBs 10 setting ABSs, averaging the measurement results of all partially protected frames is not optimal. Therefore, the measurement management unit 270 may independently perform the measurement of each partially protected frame. In other words, the measurement management unit 270 may report the measurement result of each partially protected frame to the pico eNodeB 30 without averaging the measurement result of each partially protected frame. Hereinafter, this point will be described in more detail with reference to FIG. 18.

Figure 18:
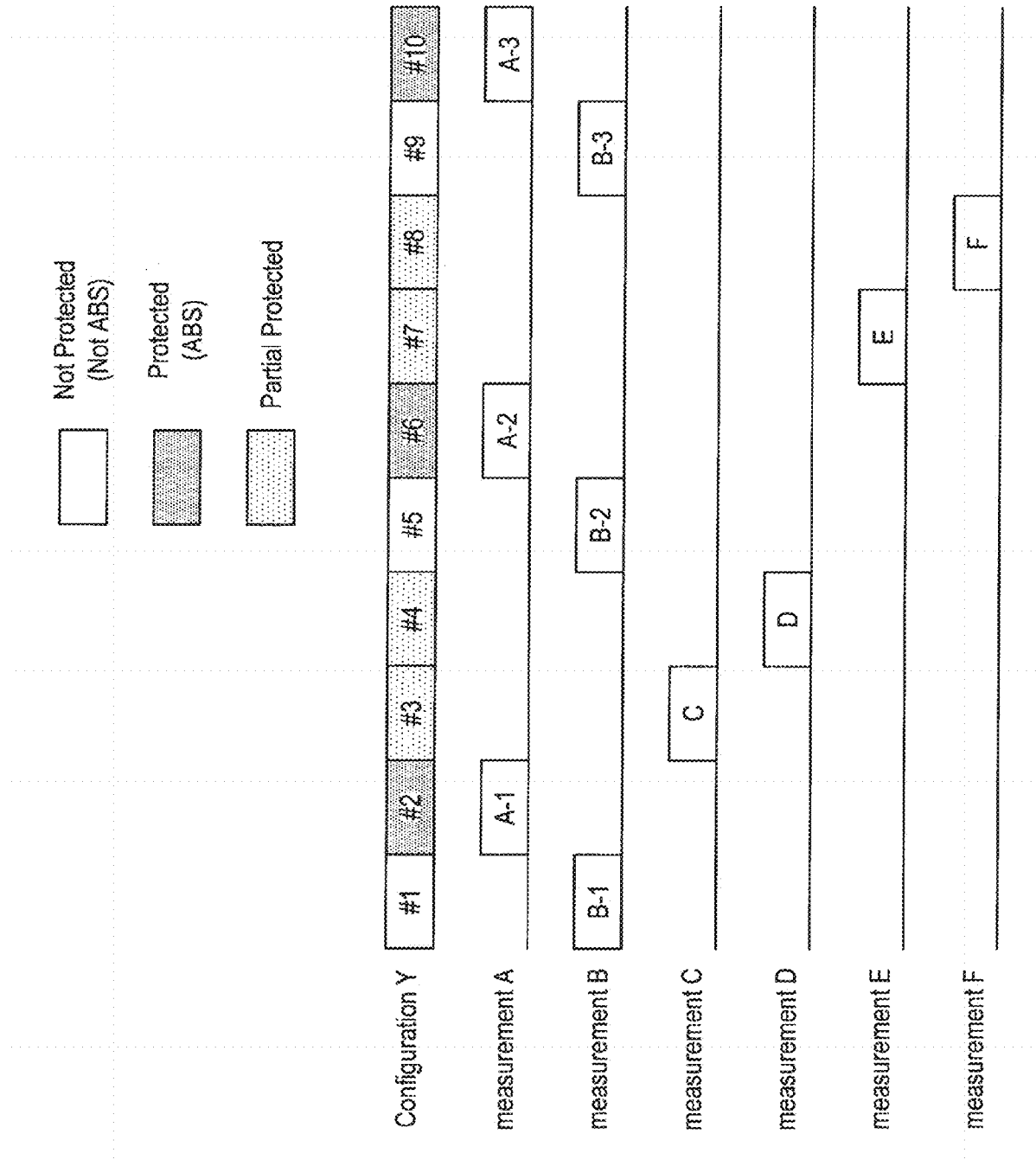
FIG. 18 is an explanatory diagram illustrating a specific example of signal quality measurement according to a third embodiment of the present disclosure.

FIG. 18 is an explanatory diagram illustrating a specific example of the signal quality measurement by the third embodiment of the present disclosure. As illustrated in FIG. 18, the UE 20 performs measurement in subframes #2, #6 and #10 which are the protected frames (A-1 to A-3), and reports an average value of the measurement result as the measurement result of the protected frames. Also, the UE 20 performs measurement in subframes #1, #5 and #9 which are the unprotected frames (B-1 to B-3), and reports an average value of the measurement result as the measurement result of the unprotected frames.

On the other hand, the subframes #3, #4 and #7, which are the partially protected frames, are independently measured. In other words, the UE 20 performs measurement in the subframe #3 which is the partially protected frame (C), and reports the measurement result, without averaging the measurement results of other partially protected frames. Also, the UE 20 may average the measurement result of the subframe #3 with the measurement result of other subframes having different cycles from the subframe #3 (for example, a subframe #1 of a next radio frame), even if the subframe is another partially protected frame.

Also, the UE 20 performs measurement in the subframe #4 which is the partially protected frame (D), and reports the measurement result without averaging the measurement results of other partially protected frames. Also, the UE 20 performs measurement in the subframe #7 which is the partially protected frame (E), and reports the measurement result without averaging with the measurement results of other partially protected frames. Likewise, the UE 20 performs measurement in the subframe #8 which is the partially protected frame (F), and reports the measurement result without averaging with the measurement results of other partially protected frames.

Since the pico eNodeB 30 receives the report of the measurement result from the UE 20 at each partially protected frame as described above, the pico eNodeB 30 may appropriately determine whether to handle the partially protected frame as the protected frame or the unprotected frame.

Application Example

Although the example of independently measuring all partially protected frames has been described above, as an application example, even when subframes are other partially protected frames, these partially protected frames may be handled as a group when the combination of the eNodeBs 10 setting the ABSs are identical. Hereinafter, the application example will be described with reference to FIG. 19.

Figure 19:
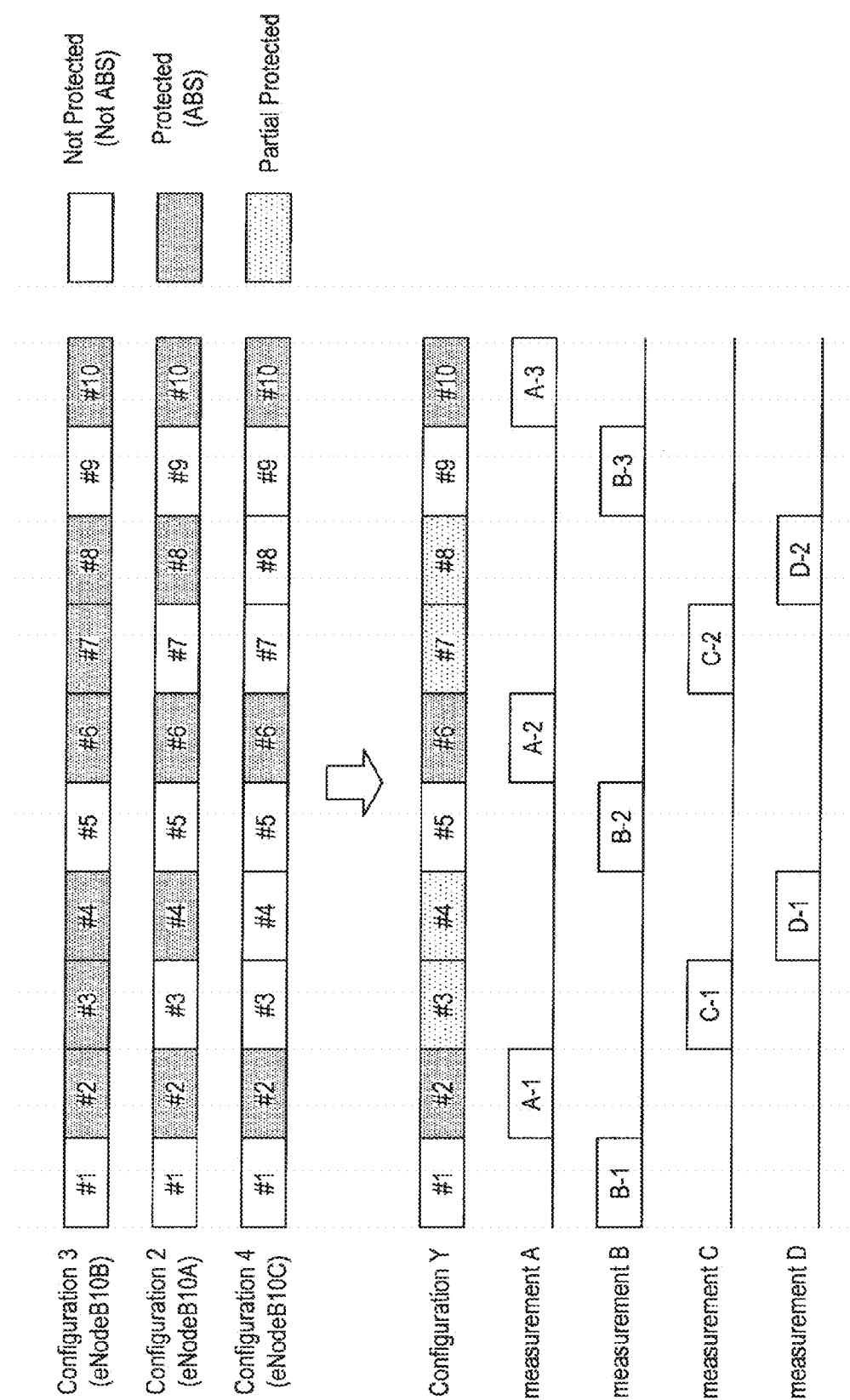
FIG. 19 is an explanatory diagram illustrating an application example of the signal quality measurement.

FIG. 19 is an explanatory diagram illustrating an application example of the signal quality measurement. More specifically, FIG. 19 illustrates an example in which the serving eNodeB 10A sets configuration 2, the neighboring eNodeBs 10B and 10C set configurations 3 and 4, respectively, and, as a result, the pico eNodeB 30 is notified of configuration Y by the serving eNodeB 10A.

Herein, in the configuration Y, although subframes #3, #4, #7 and #8 are the partially protected frames, the same eNodeB 10B sets the subframes #3 and #7 as ABSs, and the same eNodeBs 10A and 10B set the subframes #4 and #8 as ABSs. For this reason, the interference protection statuses of the subframes #3 and #7 are considered to be similar, and the interference protection statuses of the subframes #4 and #8 are also considered to be similar.

Therefore, the UE 20 may perform measurement in the subframes #3 and #7 (C-1, C-2), and report an average value of the measurement result as a measurement result of a group including the subframes #3 and #7. Likewise, the UE 20 may perform measurement in the subframes #4 and #8 (D-1, D-2), and report an average value of the measurement result as a measurement result of a group including the subframes #4 and #8.

Also, the serving eNodeB 10 may group the partially protected frames such that the partially protected frames set as ABSs by the eNodeB 10 of the same pattern constitute the same group, and report the grouping result to the pico eNodeB 30 by, for example, RRC signaling. By reporting the grouping result of the partially protected frames to the UE 20, the pico eNodeB 30 may acquire and report the measurement result of each group as described above.

4-4. Operation of Communication System

Next, the operation of the communication system according to the third embodiment of the present disclosure will be summarized with reference to FIG. 20.

FIG. 20 is a sequence diagram illustrating the operation of the communication system according to the third embodiment of the present disclosure. As illustrated in FIG. 20, first, when the eNodeB 10, for example, specifies a configuration by the interference determination unit 170 described in the first embodiment, the eNodeB 10 notifies the pico eNodeB 30 of the specified configuration (S510). The pico eNodeB 30 notifies the UE 20 of the configuration received from the eNodeB 10 (S520).

After that, the UE 20 acquires the signal quality measurement result of each partially protected frame defined by the configuration (S530), and reports the measurement result to the pico eNodeB 30 (S540).

Subsequently, the interference determination unit 370 of the pico eNodeB 30 determines whether to handle each partially protected frame as a protected frame or an unprotected frame based on the reported measurement result (S550). The scheduler 380 of the pico eNodeB 30 performs scheduling on the UE 20, which belongs to the pico eNodeB 30, according to the determination result by the interference determination unit 370 (S560).

5. CONCLUDING REMARKS

As described above, according to the first embodiment of the present disclosure, the eNodeB 30 may appropriately check the interference protection status of each subframe based on one configuration notified from the serving eNodeB 10, without notifying the pico eNodeB 30 of the plurality of configurations of the plurality of eNodeBs 10. Also, the ABS setting unit 140 of each of the plurality of neighboring eNodeBs 10 sets the same configuration to the sector directed in the central direction of the plurality of corresponding eNodeBs 10. In this way, the throughput of the pico eNodeB 30 may be improved.

Also, according to the second embodiment of the present disclosure, the configuration suitable for each pico eNodeB 30 may be obtained by determining configurations at each pico eNodeB 30 located within the eNodeB 10-2.

Also, according to the third embodiment of the present disclosure, when macro eNodeBs setting the same subframe as an ABS and macro eNodeBs not setting the same subframe as an ABS are mixed, the interference protection status of the corresponding subframe may be determined not on an eNodeB 10 side but on a pico eNodeB 30 side.

It should be understood by those skilled in the art that various modifications, combinations, sub-combinations and alterations may occur depending on design requirements and other factors insofar as they are within the scope of the appended claims or the equivalents thereof.

For example, in this specification, each step in the processing of the eNodeB 10 and the pico eNodeB 30 need not necessarily be processed in time series in order as described in the sequence diagram or the flowchart. For example, each step in the processing of the eNodeB 10 and the pico eNodeB 30 may be processed in a different order from that described in the flowchart, or may be processed in parallel.

Also, using embedded hardware such as CPU, ROM, and RAM, the eNodeB 10, the UE 20, and the pico eNodeB 30 can be implemented with a computer program capable of executing the same functions as the respective configurations of the eNodeB 10, the UE 20, and the pico eNodeB 30. Also, a recording medium storing the computer program is provided.

Additionally, the present technology may also be configured as below.

(1)

A base station including:

a setting unit configured to set a transmission limit frame, in which transmission other than a reference signal is limited, among communication frames;

a setting information reception unit configured to receive setting information of a transmission limit frame of a neighboring base station; and a determination unit configured to determine an interference protection status of each communication frame in a cell provided by the base station based on the transmission limit frame set by the setting unit and the transmission limit frame of the neighboring base station.

(2)

The base station according to (1), wherein the determination unit determines that a communication frame set as the transmission limit frame by any of the base station and the neighboring base station is a protected frame, and determines that a communication frame set as the transmission limit frame by neither the base station nor the neighboring base station is an unprotected frame.

(3)

The base station according to (1) or (2), wherein the determination unit determines that a communication frame set as the transmission limit frame by the base station is a partially protected frame when there is a neighboring base station that has not set the communication frame as the transmission limit frame.

(4)

The base station according to (1) or (2), wherein the determination unit determines that a communication frame set as the transmission limit frame by the base station or the neighboring base station is a partially protected frame when one of the base station and the neighboring base station has not set the communication frame as the transmission limit frame.

(5)

The base station according to (1) or (2), wherein the determination unit determines an interference protection status of a non-uniform communication frame, which is set as the transmission limit frame by the base station and is not set as the transmission limit frame by the neighboring base station, based on position information of a low-transmission-power type base station which has a transmission power lower than that of the base station and is disposed within the cell.

(6)

The base station according to (5), wherein the determination unit determines that the non-uniform communication frame is a protected frame when the low-transmission-power type base station is within a predetermined range from the base station.

(7)

The base station according to (5) or (6), wherein the determination unit determines that the non-uniform communication frame is an unprotected frame or a partially protected frame when the low-transmission-power type base station is outside of the predetermined range from the base station.

(8)

The base station according to any one of (1) to (7), further including a notification unit configured to notify a low-transmission-power type base station which has a transmission power lower than that of the base station and is disposed within the cell of the determination result of the determination unit.

(9)

A communication method including:

setting a transmission limit frame, in which transmission other than a reference signal from a base station is limited, among communication frames;

receiving setting information of a transmission limit frame of a neighboring base station; and determining an interference protection status of each communication frame in a cell provided by the base station based on the transmission limit frame set to the base station and the transmission limit frame of the neighboring base station.

(10)

A program for causing a computer to function as:

a setting unit configured to set a transmission limit frame, in which transmission other than a reference signal from a base station is limited, among communication frames;

a setting information reception unit configured to receive setting information of a transmission limit frame of a neighboring base station; and a determination unit configured to determine an interference protection status of each communication frame in a cell provided by the base station based on the transmission limit frame set by the setting unit and the transmission limit frame of the neighboring base station.

(A1) A method comprising:

with a processor of a base station, determining an interference protection status of a frame based at least in part on information indicating configurations of base stations, wherein a first of the configurations differs from at least a second of the configurations, and wherein a portion of the information indicating the second of the configurations is received from a second base station.

(A2) The method of (A2), wherein the first configuration indicates a first pattern of one or more frames of a first type, and/or the second configuration indicates a second pattern of one or more frames of the first type.

(A3) The method of (A2), wherein the first type of frame is a transmission limit frame type, which indicates that transmission is limited other than a reference signal.

(A4) The method of (A2), wherein the first type comprises an Almost Blank Subframe (ABS) type.

(A5) The method of (A2), further comprising:

with a communication unit, sending the interference protection status of the frame to a communication control device.

(A6) The method of (A5), wherein determining the interference protection status of the frame comprises:

determining the frame's interference protection status to be an unprotected status if the first configuration does not associate the frame with a frame of the first type;

determining the frame's interference protection status to be a protected status if each of the configurations associates the frame with a frame of the first type; and determining the frame's interference protection status to be a partially protected status if the first configuration associates the frame with a frame of the first type and at least another of the configurations does not associate the frame with a frame of the first type.

(A7) The method of (A5), wherein determining the interference protection status of the frame comprises:

determining the frame's interference protection status to be a protected status if each of the configurations associates the frame with a frame of the first type;

determining the frame's interference protection status to be a partially protected status if at least one of the configurations associates the frame with a frame of the first type and at least another of the configurations does not associate the frame with a frame of the first type; and determining the frame's interference protection status to be an unprotected status if the none of the configurations associates the frame with a frame of the first type.

(A8) The method of (A5), wherein the determining of the interference protection status of the frame for the communication control device is further based at least in part on a position of the communication control device.

(A9) The method of (A8), wherein determining the interference protection status of the frame for the communication control device based at least in part on the position of the communication control device comprises determining the interference protection status of the frame based at least in part on whether the communication control device is within a predetermined distance of the base station.

(A10) The method of (A9), wherein the communication control device is positioned within a cell of the base station.

(A11) The method of (A8), wherein determining the interference protection status of the frame comprises:

determining the frame's interference protection status to be an unprotected status if the first configuration does not associate the frame with a frame of the first type;

determining the frame's interference protection status to be a protected status if each of the configurations associates the frame with a frame of the first type, or if the first configuration associates the frame with a frame of the first type and the communication control device is positioned within a range of a first of the base stations; and determining the frame's interference protection status to be an unprotected status if the first configuration associates the frame with a frame of the first type and at least another of the configurations does not associate the frame with a frame of the first type and the communication control device is not positioned within the range of the first base station, wherein the first configuration is a configuration of the first base station.

(A12) The method of (A5), wherein:

the first configuration is a configuration of the base station, the second configuration is a configuration of the second base station, and the portion of the information indicating the second configuration is received by the base station.

(A13) The method of (A5), wherein a plurality of the configurations of a plurality of the base stations do not differ from each other, the plurality of the configurations corresponding to one or more cells that are centrally located with respect to the plurality of the base stations.

(A14) The method of (A1), further comprising associating the interference protection status with the frame.

(A15) The method of (A1), wherein the frame is a subframe of a radio frame.

(A16) A base station comprising:

an interference determination unit configured to determine an interference protection status of a frame based at least in part on information indicating configurations of two or more base stations, wherein a first of the configurations differs from at least a second of the configurations, and wherein a portion of the information indicating the second of the configurations is received from a second base station.

(A17) The base station of (A16), wherein the interference determination unit is configured to determine the interference protection status of the frame by:

determining the frame's interference protection status to be an unprotected status if the first configuration does not associate the frame with a frame of a first type;

determining the frame's interference protection status to be a protected status if each of the configurations associates the frame with a frame of the first type; and determining the frame's interference protection status to be a partially protected status if the first configuration associates the frame with a frame of the first type and at least another of the configurations does not associate the frame with a frame of the first type.

(A18) The base station of (A17), further comprising:

a communication unit configured to send the interference protection status of the frame to a communication control device; and an associating unit configured to associate the interference protection status with the frame, wherein the first configuration indicates a first pattern of one or more frames of a first type, and/or the second configuration indicates a second pattern of one or more frames of the first type, and wherein the first type comprises an Almost Blank Subframe (ABS) type.

(A19) The base station of (A16), wherein the interference determination unit is configured to determine the interference protection status of the frame by:

determining the frame's interference protection status to be a protected status if each of the configurations associates the frame with a frame of a first type;

determining the frame's interference protection status to be a partially protected status if at least one of the configurations associates the frame with a frame of the first type and at least another of the configurations does not associate the frame with a frame of the first type; and determining the frame's interference protection status to be an unprotected status if none of the configurations associates the frame with a frame of the first type.

(A20) The base station of (A19), further comprising:

a communication unit configured to send the interference protection status of the frame to a communication control device; and an associating unit configured to associate the interference protection status with the frame, wherein the first configuration indicates a first pattern of one or more frames of a first type, and/or the second configuration indicates a second pattern of one or more frames of the first type, and wherein the first type comprises an Almost Blank Subframe (ABS) type.

(A21) The base station of (A16), wherein the interference determination unit is further configured to determine the interference protection status of the frame based at least in part on a position of a communication control device.

(A22) The base station of (A21), further comprising:

a communication unit configured to send the interference protection status of the frame to a communication control device; and an associating unit configured to associate the interference protection status with the frame, wherein the first configuration indicates a first pattern of one or more frames of a first type, and/or the second configuration indicates a second pattern of one or more frames of the first type, and wherein the first type comprises an Almost Blank Subframe (ABS) type.

(A23) The base station of (A16), wherein:

the first configuration is a configuration of the base station, the second configuration is a configuration of the second base station, and the portion of the information indicating the second configuration is received by the base station.

(A24) A computer-readable medium having recorded thereon a computer program which, when executed by at least one processing unit, performs a method comprising:

determining an interference protection status of a frame based at least in part on information indicating configurations of base stations, wherein a first of the configurations differs from at least a second of the configurations, and wherein a portion of the information indicating the second of the configurations is received from a second base station.

(A25) The computer-readable medium of (A24), wherein the first configuration indicates a first pattern of one or more frames of a first type, and/or the second configuration indicates a second pattern of one or more frames of the first type.

(A26) The computer-readable medium of (A25), wherein the method further comprises: with a communication unit, sending the interference protection status of the frame to a communication control device.

(A27) A wireless communication system comprising:

a first base station including an interference determination unit; and a second base station, wherein:

the first base station is configured to store information indicating a first configuration, the second base station is configured to store information indicating a second configuration, the interference determination unit of the first base station is configured to determine an interference protection status of a frame based at least in part on the information indicating the first configuration of the first base station and the information indicating the second configuration of the second base station, and the first configuration differs from the second configuration.

(A28) The system of (A27), wherein the first configuration indicates a first pattern of one or more frames of a first type, and/or the second configuration indicates a second pattern of one or more frames of the first type.

(A29) The system of (A27), further comprising a third base station, wherein:

the first, second, and third base stations are configured to store information indicating a third configuration, the third configuration corresponds to a cell that is centrally located with respect to the first, second, and third base stations, and the first, second, and third base stations each transmit signals in the cell according to the third configuration.

REFERENCE SIGNS LIST

20 UE
104, 204, 304 Antenna group
110, 210, 310 Radio processing unit
120, 220, 320 DA conversion unit
130, 230, 330 Digital processing unit
140 ABS setting unit
150, 350 X2 communication unit
160, 260, 360 Configuration retention unit
170, 172, 370 Interference determination unit
180 Position information retention unit
270 Measurement management unit
380 Scheduler
390 Measurement result retention unit

The invention claimed is:

1. A method comprising:
    with a processor of a base station, determining an interference protection status of a frame based at least in part on information indicating configurations of base stations, wherein a first of the configurations differs from at least a second of the configurations, and wherein a portion of the information indicating the second of the configurations is received from a second base station; and
    with a communication unit, sending the interference protection status of the frame to a communication control device, wherein the first configuration indicates a first pattern of one or more frames of a first type, and/or the second configuration indicates a second pattern of one or more frames of the first type, wherein determining the interference protection status of the frame comprises:
  determining the frame's interference protection status to be an unprotected status if the first configuration does not associate the frame with a frame of the first type;
  determining the frame's interference protection status to be a protected status if each of the configurations associates the frame with a frame of the first type; and
  determining the frame's interference protection status to be a partially protected status if the first configuration associates the frame with a frame of the first type and at least another of the configurations does not associate the frame with a frame of the first type.

2. The method of claim 1, wherein the first type of frame is a transmission limit frame type, which indicates that transmission is limited other than a reference signal.

3. The method of claim 1, wherein the first type comprises an Almost Blank Subframe (ABS) type.

4. The method of claim 1, wherein the determining of the interference protection status of the frame for the communication control device is further based at least in part on a position of the communication control device.

5. The method of claim 4, wherein determining the interference protection status of the frame for the communication control device based at least in part on the position of the communication control device comprises determining the interference protection status of the frame based at least in part on whether the communication control device is within a predetermined distance of the base station.

6. The method of claim 5, wherein the communication control device is positioned within a cell of the base station.

7. The method of claim 1, wherein:
  the first configuration is a configuration of the base station,
  the second configuration is a configuration of the second base station, and
  the portion of the information indicating the second configuration is received by the base station.

8. The method of claim 1, wherein a plurality of the configurations of a plurality of the base stations do not differ from each other, the plurality of the configurations corresponding to one or more cells that are centrally located with respect to the plurality of the base stations.

9. The method of claim 1, further comprising associating the interference protection status with the frame.

10. The method of claim 1, wherein the frame is a subframe of a radio frame.

11. A base station comprising:
  an interference determination unit configured to determine an interference protection status of a frame based at least in part on information indicating configurations of two or more base stations, wherein a first of the configurations differs from at least a second of the configurations, and wherein a portion of the information indicating the second of the configurations is received from a second base station,
  wherein the interference determination unit is configured to determine the interference protection status of the frame by:
    determining the frame's interference protection status to be a protected status if each of the configurations associates the frame with a frame of a first type;
    determining the frame's interference protection status to be a partially protected status if at least one of the configurations associates the frame with a frame of the first type and at least another of the configurations does not associate the frame with a frame of the first type; and
    determining the frame's interference protection status to be an unprotected status if none of the configurations associates the frame with a frame of the first type.

12. The base station of claim 11, further comprising:
  a communication unit configured to send the interference protection status of the frame to a communication control device; and
  an associating unit configured to associate the interference protection status with the frame,
  wherein the first configuration indicates a first pattern of one or more frames of a first type, and/or the second configuration indicates a second pattern of one or more frames of the first type, and
  wherein the first type comprises an Almost Blank Subframe (ABS) type.

13. The base station of claim 11, wherein the interference determination unit is further configured to determine the interference protection status of the frame further based at least in part on a position of a communication control device.

14. The base station of claim 13, further comprising:
  a communication unit configured to send the interference protection status of the frame to a communication control device; and
  an associating unit configured to associate the interference protection status with the frame, wherein the first configuration indicates a first pattern of one or more frames of a first type, and/or the second configuration indicates a second pattern of one or more frames of the first type, and
  wherein the first type comprises an Almost Blank Subframe (ABS) type.

15. The base station of claim 11, wherein:
  the first configuration is a configuration of the base station,
  the second configuration is a configuration of the second base station, and
  the portion of the information indicating the second configuration is received by the base station.

16. A non-transitory computer-readable storage medium having recorded thereon a computer program which, when executed by at least one processing unit, performs a method comprising:
  determining an interference protection status of a frame based at least in part on information indicating configurations of base stations, wherein a first of the configurations differs from at least a second of the configurations, and wherein a portion of the information indicating the second of the configurations is received from a second base station,
  wherein determining the interference protection status of the frame comprises:
    determining the frame's interference protection status to be a protected status if each of the configurations associates the frame with a frame of the first type;
    determining the frame's interference protection status to be a partially protected status if at least one of the configurations associates the frame with a frame of the first type and at least another of the configurations does not associate the frame with a frame of the first type; and
    determining the frame's interference protection status to be an unprotected status if none of the configurations associates the frame with a frame of the first type.

17. The non-transitory computer-readable storage medium of claim 16, wherein the first configuration indicates a first pattern of one or more frames of a first type, and/or the second configuration indicates a second pattern of one or more frames of the first type.

18. The non-transitory computer-readable storage medium of claim 17, wherein the method further comprises: with a communication unit, sending the interference protection status of the frame to a communication control device.

19. A wireless communication system comprising:
   a first base station including an interference determination unit; and
   a second base station,
   wherein:
      the first base station is configured to store information indicating a first configuration,
      the second base station is configured to store information indicating a second configuration,
      the interference determination unit of the first base station is configured to determine an interference protection status of a frame based at least in part on the information indicating the first configuration of the first base station and the information indicating the second configuration of the second base station,
      the first configuration differs from the second configuration, and
      the interference determination unit is configured to determine the interference protection status of the frame further based at least in part on a position of the communication control device, by:
         determining the frame's interference protection status to be an unprotected status if the first configuration does not associate the frame with a frame of a first type;
         determining the frame's interference protection status to be a protected status if each of the configurations associates the frame with a frame of the first type, or if the first configuration associates the frame with a frame of the first type and the communication control device is positioned within a range of a first of the base stations; and
         determining the frame's interference protection status to be an unprotected status if the first configuration associates the frame with a frame of the first type and at least another of the configurations does not associate the frame with a frame of the first type and the communication control device is not positioned within the range of the first base station,
      wherein the first configuration is a configuration of the first base station.

20. The system of claim 19, wherein the first configuration indicates a first pattern of one or more frames of the first type, and/or the second configuration indicates a second pattern of one or more frames of the first type.

21. The system of claim 19, further comprising a third base station, wherein:
   the first, second, and third base stations are configured to store information indicating a third configuration,
   the third configuration corresponds to a cell that is centrally located with respect to the first, second, and third base stations, and
   the first, second, and third base stations each transmit signals in the cell according to the third configuration.

* * * * *